US012058592B2

(12) United States Patent
Yang et al.

(10) Patent No.: US 12,058,592 B2
(45) Date of Patent: Aug. 6, 2024

(54) VEHICLE-TO-VEHICLE MANEUVER SHARING AND COORDINATING

(71) Applicant: QUALCOMM Incorporated, San Diego, CA (US)

(72) Inventors: Seung Ryul Yang, San Diego, CA (US); Dan Vassilovski, Del Mar, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/302,174

(22) Filed: Apr. 26, 2021

(65) Prior Publication Data

US 2021/0360373 A1 Nov. 18, 2021

Related U.S. Application Data

(60) Provisional application No. 63/023,540, filed on May 12, 2020.

(51) Int. Cl.
*H04W 4/46* (2018.01)
*B60W 60/00* (2020.01)
*G05D 1/00* (2024.01)

(52) U.S. Cl.
CPC ............ *H04W 4/46* (2018.02); *B60W 60/001* (2020.02); *G05D 1/00* (2013.01)

(58) Field of Classification Search
None
See application file for complete search history.

(56) References Cited

U.S. PATENT DOCUMENTS

| 2017/0019524 | A1 | 1/2017 | Kohler et al. |
| 2018/0308360 | A1 | 10/2018 | Regmi |
| 2021/0094577 | A1* | 4/2021 | Shalev-Shwartz ........... B60W 30/0953 |
| 2021/0146922 | A1* | 5/2021 | Fuchs ............... B60W 30/0956 |
| 2021/0245758 | A1* | 8/2021 | Ahmad .................. G08G 1/166 |
| 2021/0385630 | A1* | 12/2021 | Yang ...................... H04W 4/12 |
| 2022/0375344 | A1* | 11/2022 | Yang ...................... G08G 1/164 |

FOREIGN PATENT DOCUMENTS

| CN | 104240535 A | 12/2014 |
| EP | 3614354 A1 | 2/2020 |
| WO | WO-2018171712 A1 | 9/2018 |
| WO | WO-2019089189 A1 | 5/2019 |

OTHER PUBLICATIONS

International Search Report and Written Opinion—PCT/US2021/070465—ISA/EPO—Jul. 1, 2021.

* cited by examiner

*Primary Examiner* — Tuan C To
*Assistant Examiner* — David Ruben Pedersen
(74) *Attorney, Agent, or Firm* — QUALCOMM Incorporated

(57) ABSTRACT

Various aspects of the present disclosure generally relate to wireless communication. In some aspects, a user equipment (UE) may transmit an intended maneuver message for a maneuver of a vehicle associated with the UE, wherein the intended maneuver message identifies one or more target road resources associated with the maneuver, receive, from one or more other UEs, one or more responses to the intended maneuver message, and perform an action based at least in part on receiving the one or more responses to the intended maneuver message. Numerous other aspects are provided.

30 Claims, 12 Drawing Sheets

VEHICLE-TO-VEHICLE MANEUVER SHARING AND COORDINATING

CROSS-REFERENCE TO RELATED APPLICATION

This Patent Application claims priority to U.S. Provisional Patent Application No. 63/023,540, filed on May 12, 2020, entitled "VEHICLE-TO-VEHICLE MANEUVER SHARING AND COORDINATING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for vehicle-to-vehicle (V2V) maneuver sharing and coordinating.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting an intended maneuver message for a maneuver of a vehicle associated with the UE, wherein the intended maneuver message identifies one or more target road resources associated with the maneuver; receiving, from one or more other UEs, one or more responses to the intended maneuver message; and performing an action based at least in part on receiving the one or more responses to the intended maneuver message.

In some aspects, a method of wireless communication, performed by a UE, may include receiving, from a different UE, an intended maneuver message for a maneuver of a vehicle associated with the different UE, wherein the intended maneuver message identifies one or more target road resources associated with the maneuver; and transmitting, to the different UE, a response to the intended maneuver message indicating an acceptance or a rejection of the maneuver based at least in part on a determination whether to accept or reject the maneuver associated with the one or more target road resources.

In some aspects, a UE for wireless communication may include a memory and one or more processors coupled to the memory. The one or more processors may be configured to transmit an intended maneuver message for a maneuver of a vehicle associated with the UE, wherein the intended maneuver message identifies one or more target road resources associated with the maneuver; receive, from one or more other UEs, one or more responses to the intended maneuver message; and perform an action based at least in part on receiving the one or more responses to the intended maneuver message.

In some aspects, a UE for wireless communication may include a memory and one or more processors coupled to the memory. The one or more processors may be configured to receive, from a different UE, an intended maneuver message for a maneuver of a vehicle associated with the different UE, wherein the intended maneuver message identifies one or more target road resources associated with the maneuver; and transmit, to the different UE, a response to the intended maneuver message indicating an acceptance or a rejection of the maneuver based at least in part on a determination whether to accept or reject the maneuver associated with the one or more target road resources.

In some aspects, a non-transitory computer-readable medium may store one or more instructions for wireless communication. The one or more instructions, when executed by one or more processors of a UE, may cause the one or more processors to transmit an intended maneuver message for a maneuver of a vehicle associated with the UE, wherein the intended maneuver message identifies one or more target road resources associated with the maneuver; receive, from one or more other UEs, one or more responses to the intended maneuver message; and perform an action based at least in part on receiving the one or more responses to the intended maneuver message.

In some aspects, a non-transitory computer-readable medium may store one or more instructions for wireless communication. The one or more instructions, when executed by one or more processors of a UE, may cause the one or more processors to receive, from a different UE, an intended maneuver message for a maneuver of a vehicle associated with the different UE, wherein the intended maneuver message identifies one or more target road resources associated with the maneuver; and transmit, to the different UE, a response to the intended maneuver message indicating an acceptance or a rejection of the maneuver based at least in part on a determination whether to accept or reject the maneuver associated with the one or more target road resources.

In some aspects, an apparatus for wireless communication may include means for transmitting an intended maneuver message for a maneuver of a vehicle associated with the apparatus, wherein the intended maneuver message identifies one or more target road resources associated with the maneuver; means for receiving, from one or more other apparatuses, one or more responses to the intended maneuver message; and means for performing an action based at least in part on receiving the one or more responses to the intended maneuver message.

In some aspects, an apparatus for wireless communication may include means for receiving, from a UE, an intended maneuver message for a maneuver of a vehicle associated with the UE, wherein the intended maneuver message identifies one or more target road resources associated with the maneuver; and means for transmitting, to the UE, a response to the intended maneuver message indicating an acceptance or a rejection of the maneuver based at least in part on a determination whether to accept or reject the maneuver associated with the one or more target road resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
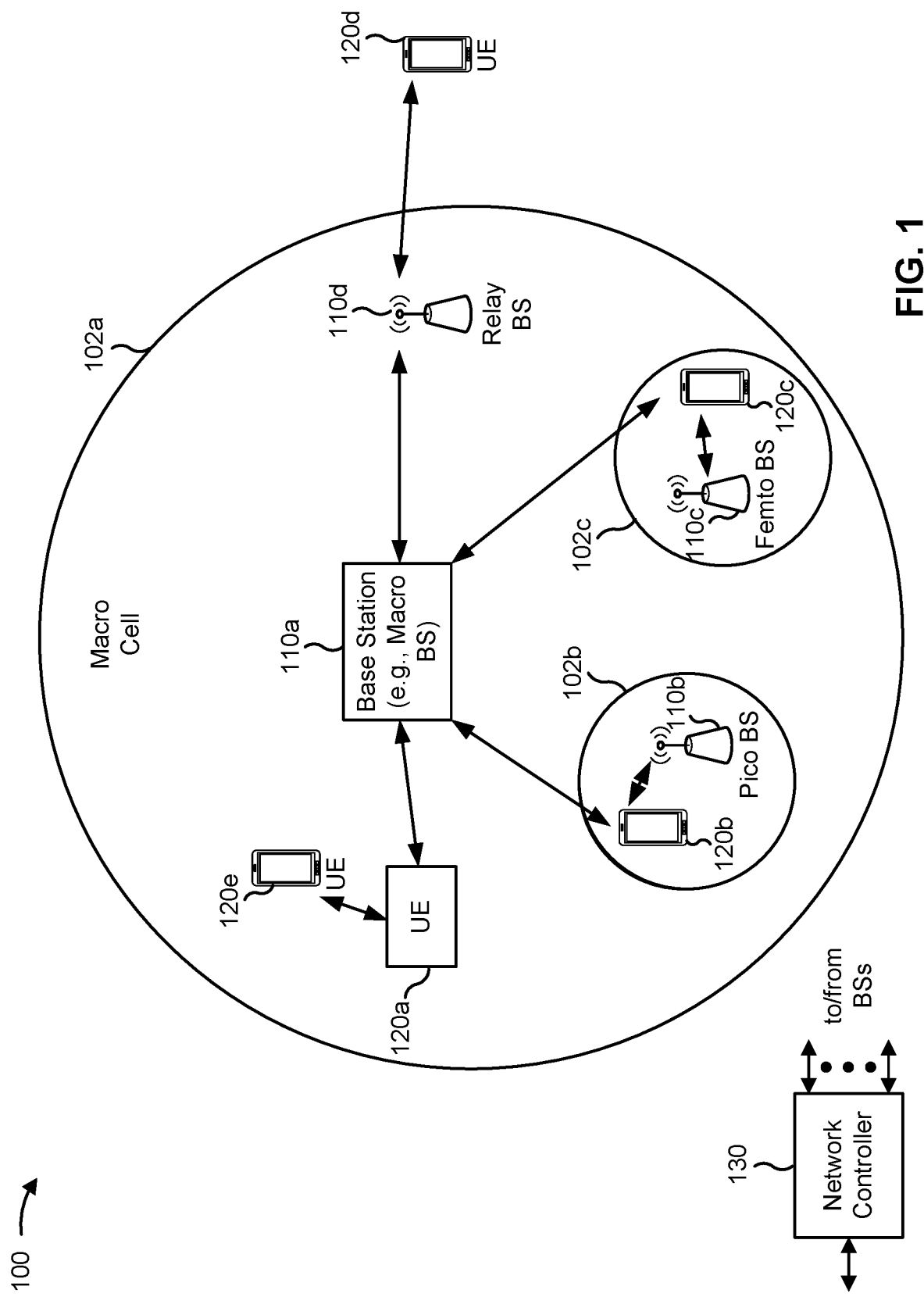
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
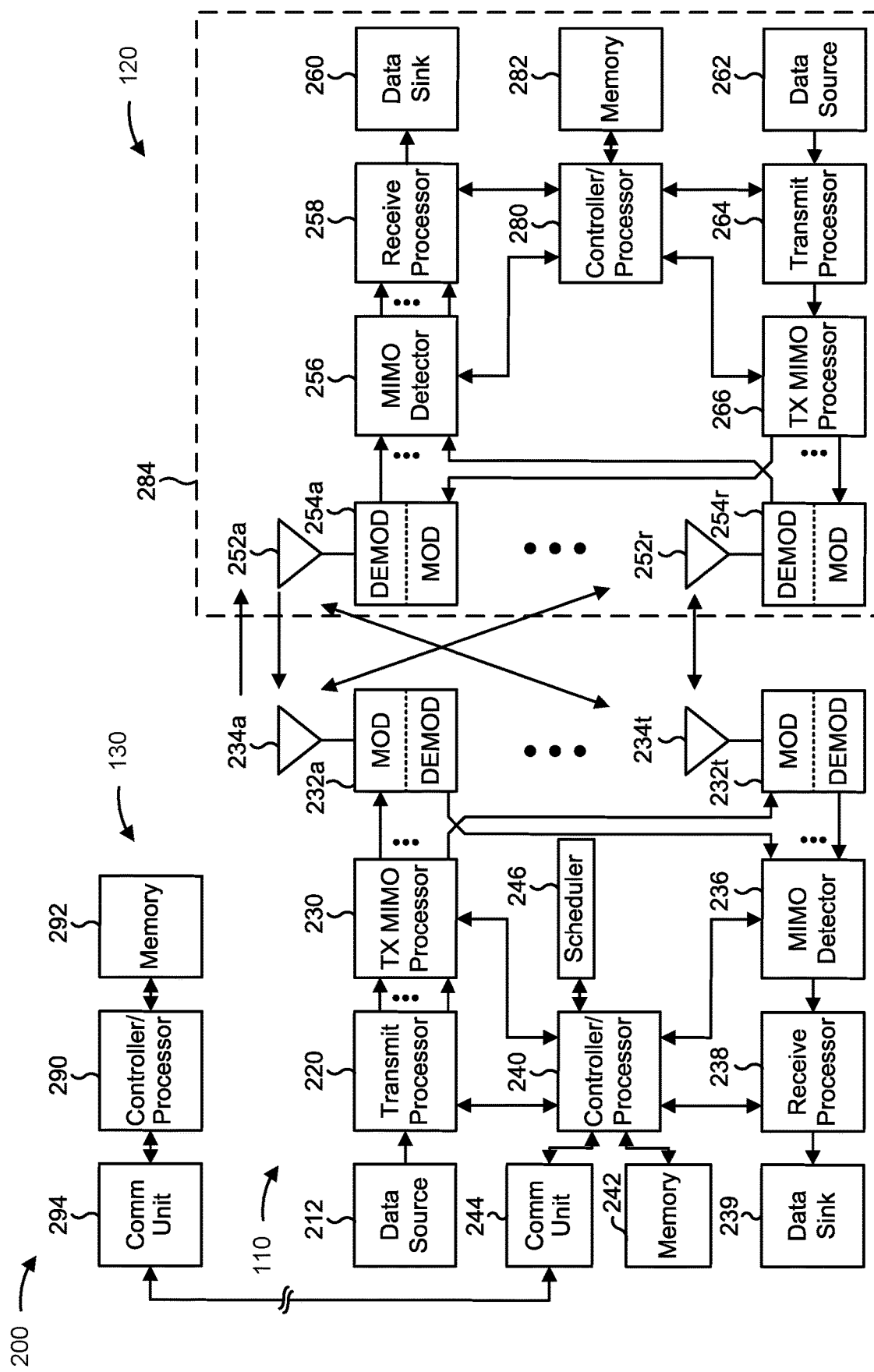
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-12).

Controller/processor 240 of base station 110, controller/processor 280 of UE 120, and/or any other component(s) of FIG. 2 may perform one or more techniques associated with V2V maneuver sharing and coordinating, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, UE 120 may include means for transmitting an intended maneuver message for a maneuver of a vehicle associated with the UE, wherein the intended maneuver message identifies one or more target road resources associated with the maneuver, means for receiving, from one or more other UEs, one or more responses to the intended maneuver message, means for performing an action based at least in part on receiving the one or more responses to the intended maneuver message, means for receiving a response, from each UE of a set of UEs associated with the target road resource, to the intended maneuver message indicating an acceptance of the maneuver using the target road resource, and/or means for determining that the UE has not received, from any other UEs, a response to the intended maneuver message indicating a rejection of the maneuver using the target road resource, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
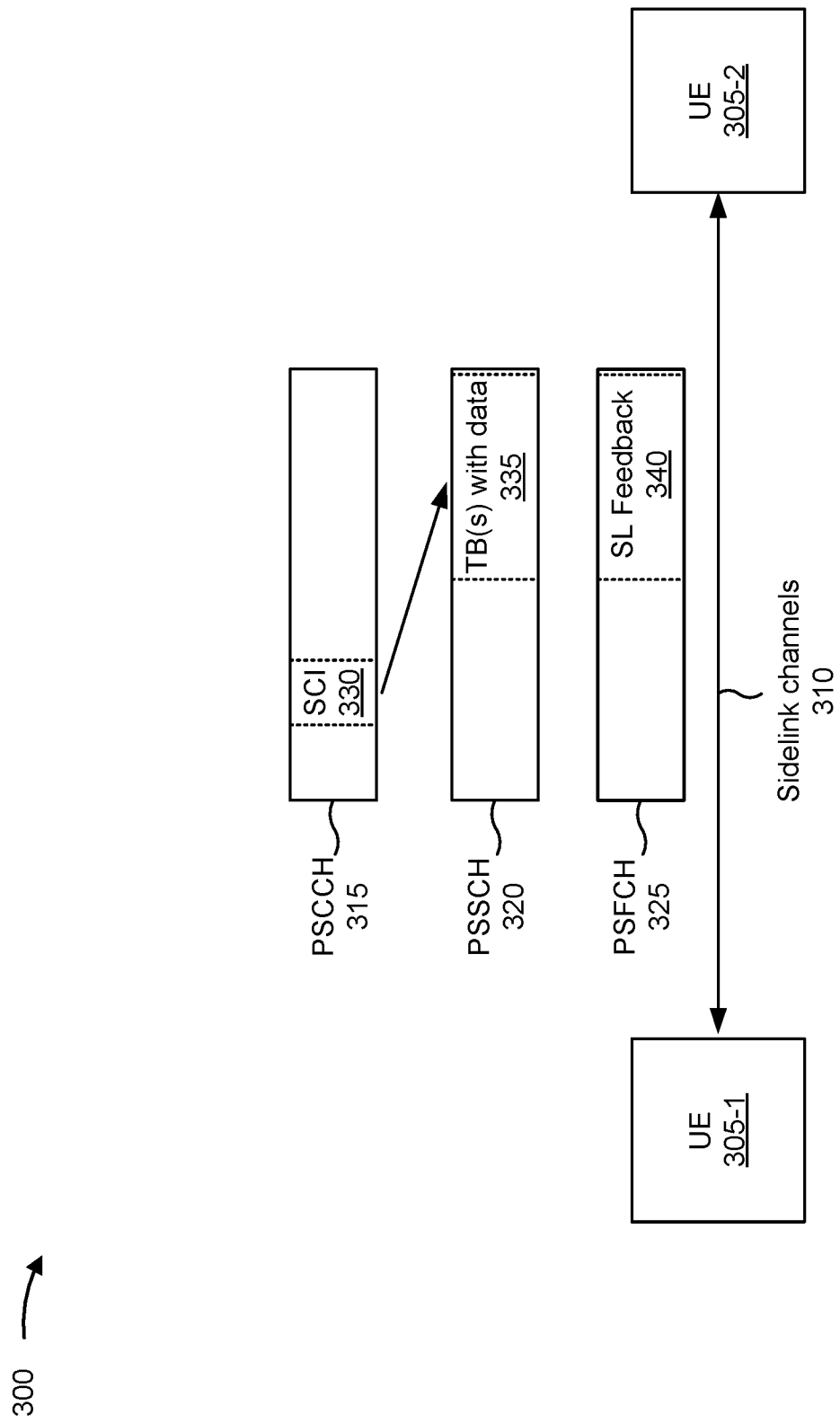
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to pedestrian (V2P) communications, and/or the like), and/or mesh networking, among other examples. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/ NACK) information), transmit power control (TPC), and/or a scheduling request (SR), among other examples.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, among other examples, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
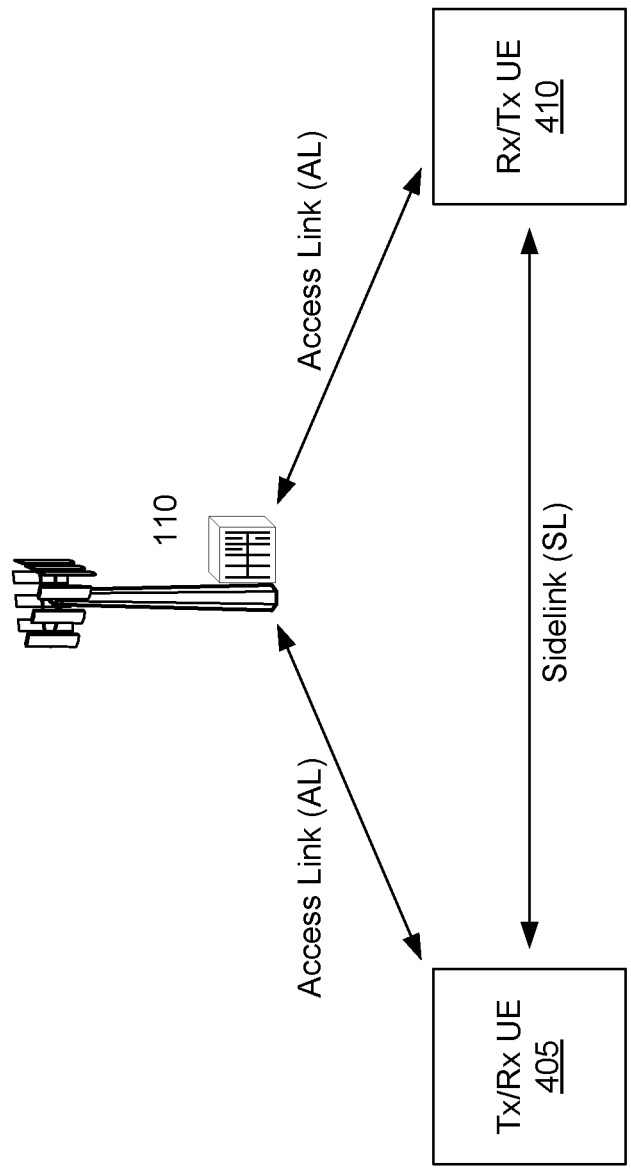
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In some wireless networks, UEs may communicate using a V2X protocol (e.g., which may include a V2V protocol, and/or a V2I protocol, among other examples). For example, a UE may be associated with a vehicle. The UEs of different vehicles may communicate to share and coordinate maneuvers between the different vehicles. However, it may be difficult to negotiate and coordinate maneuvers among a plurality of UEs associated with a plurality of vehicles due to the dynamic nature of moving vehicles. For example, an environment of a UE of a vehicle attempting to share and coordinate a maneuver may change rapidly. Additionally, negotiating between a plurality of UEs associated with a plurality of vehicles may consume network resources, and/ or processing resources, among other examples, associated with the negotiations.

Some techniques and apparatuses described herein enable efficient V2V maneuver sharing and coordinating among UEs of different vehicles. For example, a UE of a vehicle initiating a maneuver (e.g., a host vehicle) may transmit the request and indicate one or more road resources (e.g., areas of a road that the host vehicle intends to move to) targeted for the maneuver (e.g., target road resources). Additionally, a UE may define (or associate) the target road resource(s) with dynamic information and contextual information of the environment of the UE. Moreover, one or more other UEs of other vehicles (e.g., remote vehicles) negotiating with the UE of the host vehicle may be enabled to determine if a target road resource is associated with the UE of the remote vehicle, determine a type of maneuver associated with the request from the UE of the host vehicle, and respond to the request based at least in part on the information indicated in the request. As a result, the UEs (e.g., the UE of the host vehicle and one or more UEs of one or more remote vehicles) may efficiently share and coordinate maneuvers between each other. This may conserve network resources, and/or processing resources, among other examples, that would have otherwise been used negotiating the maneuvers without using dynamic information and contextual information, without allowing multiple target road resources to be indicated in an initial maneuver request from a UE of a host vehicle, among other examples.

Figure 5:
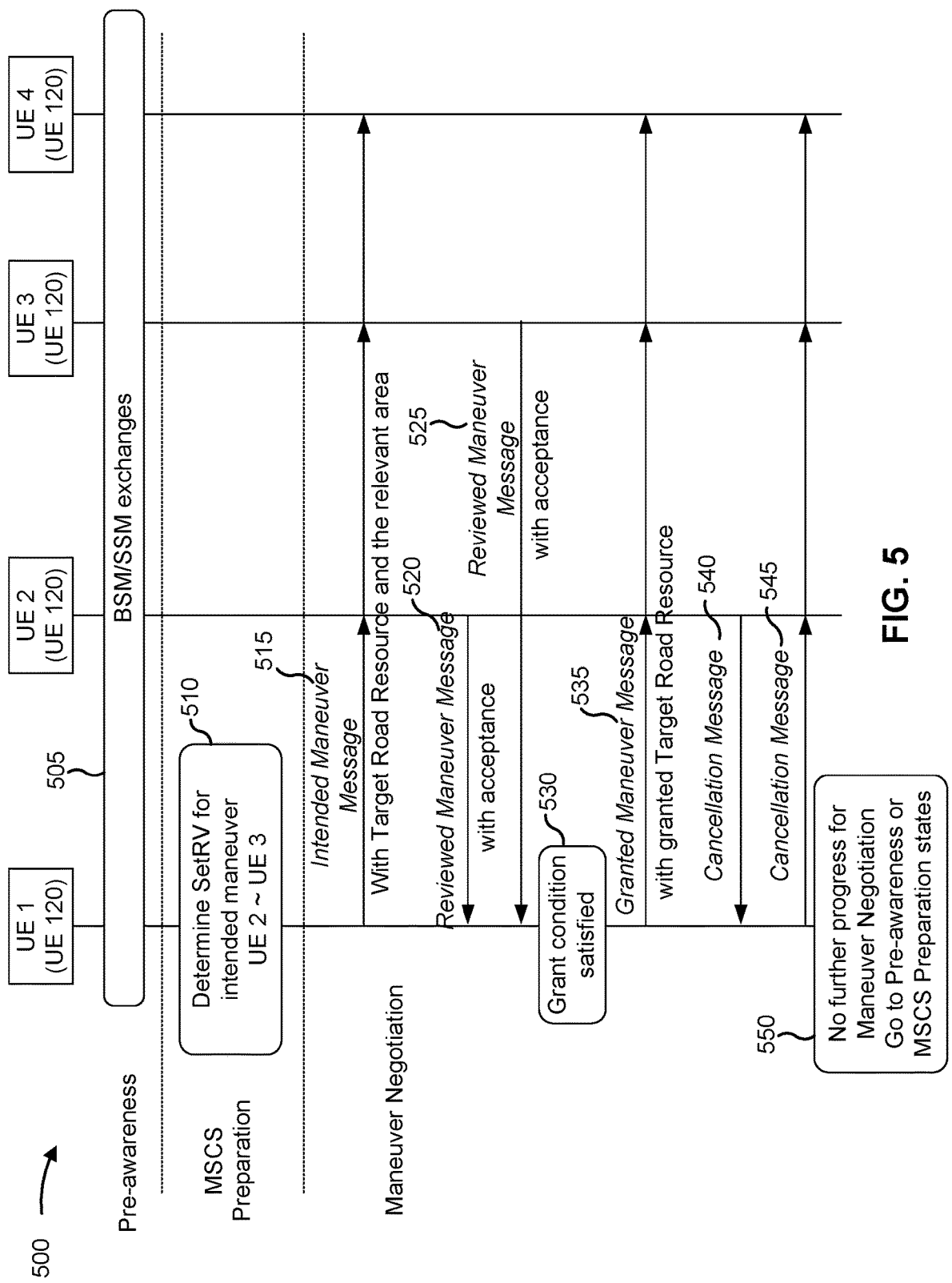
FIGS. 5-10 are diagrams illustrating examples associated with vehicle-to-vehicle (V2V) maneuver sharing and coordinating, in accordance with the present disclosure.

FIG. 5 is a diagram illustrating an example 500 of V2V maneuver sharing and coordinating, in accordance with the present disclosure. As shown in FIG. 5, one or more UEs 120 may communicate with one another. Each UE 120 may be associated with a vehicle. For example, a first UE 120 (e.g., UE 1) may be associated with a host vehicle (e.g., a vehicle that is initiating a maneuver). The remaining UEs 120 (e.g., UE 2, UE 3, and/or UE 4) may be associated with remote vehicles (e.g., vehicles that are involved in the negotiation of the maneuver with the host vehicle). As described herein, communications between a host vehicle and one or more remote vehicles may refer to communications between a UE 120 of the host vehicle and UEs 120 of the one or more remote vehicles. Additionally, or alternatively, communications between a host vehicle and one or more remote vehicles may be performed by, or associated with, an on-board unit (OBU) of a vehicle (e.g., a UE 120 may be, or may be included in, an OBU of a vehicle).

As show by reference number 505, the UEs 120 may transmit and receive basic safety messages (BSMs), and/or sensor sharing messages (SSMs), among other examples. The exchanging of BSMs and SSMs among the UEs 120 may be referred to as a pre-awareness state. A BSM may be a communication that indicates information regarding a vehicle's position, location, heading, speed, acceleration, and/or other information indicating a vehicle's state and/or predicted path. An SSM may be a communication that indicates information indicated by one or more sensors of a vehicle. The one or more sensors may indicate information (e.g., similar to the information indicated by a BSM) regarding the vehicle. The SSM may enable other UEs 120 to determine the information indicated by the one or more sensors of the vehicle transmitting the SSM. The UEs 120 may exchange BSMs and/or SSMs according to one or more technical standards, such as the Society of Automotive Engineers (SAE) International Standard J2945/1, J3161/1, and/or J3224, among other examples.

As shown by reference number 510, the first UE 120 (e.g., of the host vehicle) may determine a set of one or more UEs (e.g., a set of one or more remote vehicles, SetRV) for an intended maneuver (e.g., an intended maneuver to be performed by the host vehicle). During this time, the first UE 120 may be in a preparation state (e.g., a maneuver sharing and coordinating service (MSCS) preparation state). The intended maneuver may indicate a target road resource associated with the maneuver. The target road resource may be an area of a road on which the host vehicle is traveling that is to be used to execute the maneuver (e.g., an area of the road that the host vehicle may occupy after completing the intended maneuver). The first UE 120 may determine the set of one or more UEs for the intended maneuver based at least in part on a relevant area associated with the maneuver.

The relevant area may be an area surrounding the target road resource that is large enough to include any remote vehicles on the road that may have a conflict with the intended maneuver. The relevant area may include distance ahead of the target road resource, a distance behind the target road resource, and/or a distance on each side of the target road resource. The size of the relevant area may be based at least in part on a speed of the host vehicle, a size of the host vehicle, a speed of the target road resource, a maximum speed associated with the road on which the host vehicle is traveling, location characteristics of the target road resource, temporal characteristics of the target road resource, and/or contextual characteristics of the target road resource, among other examples. The determination of the relevant area of a target road resource is discussed in more detail below with respect to FIG. 10.

The first UE 120 may determine that a UE 120 of a remote vehicle should be included in the set of one or more UEs for the intended maneuver based at least in part on determining that the UE 120 of the remote vehicle is located within the relevant area of the target road resource. The first UE 120 may determine the location of the UE 120 of the remote vehicle based at least in part on one or more BSMs received from the UE 120 of the remote vehicle, and/or one or more SSMs received from the UE 120 of the remote vehicle, among other examples. For example, as shown by reference number 510, the first UE 120 may determine that the second UE 120 and the third UE 120 are to be included in the set of one or more UEs 120 for the intended maneuver of the host vehicle.

In some aspects, the first UE 120 may track and/or maintain information related to the UEs 120 included in the set of one or more UEs 120 for the intended maneuver (e.g., the second UE 120 and/or the third UE 120). For example, for a UE 120 included in the set of one or more UEs 120 for the intended maneuver, the first UE 120 may track and/or maintain a vehicle identifier associated with the UE 120, a location of the UE 120, and/or dynamic information associated with the UE 120 (e.g., heading, speed, acceleration, and/or the like), among other examples. In some aspects, the first UE 120 may track and/or maintain the information related to the UEs 120 included in the set of one or more UEs 120 for the intended maneuver until the first UE 120 exits a negotiation state associated with the intended maneuver, as described below.

As shown by reference number 515, the first UE 120 may transmit an intended maneuver message that indicates the intended maneuver, the target road resource associated with the intended maneuver, and/or the relevant area of the target road resource. In some aspects, the transmission of the intended maneuver message may be a broadcast transmission. In some aspects, the transmission of the intended maneuver message may not include the relevant area of the target road resource (e.g., a type 1 broadcast). In some aspects, the transmission of the intended maneuver message may include the relevant area of the target road resource (e.g., a type 2 broadcast). In some aspects, the transmission of the intended maneuver message may be a groupcast transmission to the UEs 120 included in the set of one or more UEs 120 for the intended maneuver. The groupcast transmission may be a transmission on a data link layer (e.g., Layer 2), a network layer (e.g., Layer 3) and/or a transport layer (e.g., Layer 4).

The intended maneuver message may indicate the target road resource using temporal information (e.g., an earliest time associated with the target road resource and/or a latest time associated with the target road resource), size information (e.g., length, width, height, radius, and/or the like), location information, (e.g., latitude, longitude, elevation, and/or the like), and/or motion information (e.g., kinematic information, such as a heading, a speed, an acceleration, and/or the like). The first UE 120 may determine a heading range of the target road resource based at least in part on a targeted heading range of the vehicle associated with the first UE 120 (e.g., the host vehicle) when executing the intended maneuver. The first UE 120 may determine a speed range associated with the target road resource of the one or more target road resources based at least in part on a targeted speed range of the host vehicle when executing the intended maneuver. The first UE 120 may determine an acceleration range associated with the target road resource of the one or more target road resources based at least in part on a targeted acceleration range of the host vehicle when executing the intended maneuver. The first UE 120 may indicate the target road resource using a lane identifier of a lane of the road in which the target road resource is located.

The first UE 120 may indicate the target road resource using dynamic location information. For example, the first UE 120 may determine a dynamic front location of the target road resource based at least in part on a dynamic location of a first moving vehicle, and may determine a dynamic rear location of the target road resource based at least in part on a dynamic location of a second moving vehicle. The first UE 120 may identify the dynamic location of the target road resource using vehicle identifiers and/or locations of the first vehicle and/or second vehicle. In some aspects, the first UE 120 may determine a dynamic front location or a dynamic rear location of the target road resource of the one or more target road resources based at least in part on a dynamic location of a moving vehicle. The first UE 120 may identify the dynamic location of the target road resource using an identifier of whether the moving vehicle is used to identify the dynamic front location or the dynamic rear location of the target road resource, a vehicle identifier identifying the moving vehicle, a location of the moving vehicle, and/or a distance identifier indicating a distance from the location of the moving vehicle to the opposite end of the target road resource.

In some aspects, the intended maneuver message may indicate a maneuver type associated with the intended maneuver. The maneuver type may provide additional context of the intended maneuver to the one or more UEs 120 that receive the intended maneuver message. In some aspects, the maneuver type may indicate a priority level associated with the maneuver (e.g., emergency, high priority, and/or low priority). In some aspects, the maneuver type may indicate a primary maneuver type and/or a secondary maneuver type. The maneuver type may include a lane maintenance maneuver type, a lane change maneuver type, a swerve maneuver type, a turning maneuver type, a crossing lane maneuver type, a change in direction maneuver type, a reverse driving maneuver type, an overtake maneuver type, a passing maneuver type, an intersection handling maneuver type, an interchange maneuver type, a pedestrian crossing maneuver type, a cycle crossing maneuver type, a railway crossing maneuver type, a turnabout maneuver type, a leaving or joining traffic maneuver type, a school zone handling maneuver type, an avoidance maneuver type, an emergency maneuver type, and/or a cut-in maneuver type, among other examples.

The transmission of the intended maneuver message may be received by one or more UEs 120 of remote vehicles (e.g., the second UE 120, the third UE 120, a fourth UE 120, and/or the like) within a range of the first UE 120. For example, as shown in FIG. 5, the intended maneuver message may be received by one or more UEs 120 that are not included in the set of one or more UEs 120 for the intended maneuver. For example, a vehicle of a UE 120 may be within a range of the transmission (e.g., the broadcast transmission) of the intended maneuver message by the first UE 120, but not within the relevant area of the target road resource. Additionally, or alternatively, a UE 120 of a vehicle may not be detected by the first UE 120 when determining the set of one or more UEs 120 for the intended maneuver.

A UE 120 that receives the intended maneuver message (e.g., a UE 120 of a remote vehicle) may determine whether to respond to the intended maneuver message based at least in part on determining whether the remote vehicle associated with the UE 120 is located within the relevant area of the target road resource. In some aspects, where the transmission of the intended maneuver message is a type 1 broadcast transmission (e.g., where the transmission of the intended maneuver message does not indicate the relevant area) the UE 120 that receives the intended maneuver message may determine the relevant area of the target road resource (e.g., as described below with respect to FIG. 10). The UE 120 that receives the intended maneuver message may determine whether the UE 120 is located within the relevant area of the target road resource. If the UE 120 determines that the UE 120 is located within the relevant area of the target road resource, the UE 120 may determine a response to the intended maneuver message. If the UE 120 determines that the UE 120 is not located within the relevant area of the target road resource, the UE 120 may not determine a response to the intended maneuver message (e.g., may ignore the intended maneuver message).

In some aspects, where the transmission of the intended maneuver message is a type 2 broadcast transmission (e.g., where the transmission of the intended maneuver message does indicate the relevant area) the UE 120 that receives the intended maneuver message may confirm that the UE 120 is located within the relevant area indicated in the intended maneuver message. The UE 120 that receives the intended maneuver message may determine a response to the intended maneuver message based at least in part on confirming that the UE 120 is located within the relevant area indicated in the intended maneuver message.

In some aspects, where the transmission of the intended maneuver message is a groupcast transmission, the UE 120 that receives the intended maneuver message may determine a response to the intended maneuver message based at least in part on receiving the intended maneuver message via the groupcast transmission. That is, the UE 120 that receives the intended maneuver message via the groupcast transmission may automatically recognize itself as part of the set of one or more UEs 120 for the intended maneuver without determining the relevant area of the target road resource and/or confirming that the UE 120 is located within the relevant area of the target road resource. This may conserve time and/or processing resources that would have otherwise been used by the UE 120 that receives the intended maneuver message determining the relevant area of the target road resource and/or confirming that the UE 120 is located within the relevant area of the target road resource.

For example, as shown in FIG. 5, the second UE 120 and the third UE 120 may determine a response to the intended maneuver message. For example, the second UE 120 may receive the intended maneuver message and may determine the relevant area of the target road resource indicated in the intended maneuver message and/or confirm that the second UE 120 is located within the relevant area of the target road resource. The second UE 120 may determine a response to the intended maneuver message based at least in part on determining the relevant area of the target road resource and/or confirming that the second UE 120 is located within the relevant area of the target road resource. As shown in FIG. 5, the fourth UE 120 may receive the intended maneuver message (e.g., via a type 1 broadcast transmission and/or a type 2 broadcast transmission) and may ignore the intended maneuver message (e.g., not determine a response to the intended maneuver message) based at least in part on determining the relevant area of the target road resource and/or confirming that the fourth UE 120 is not located within the relevant area of the target road resource.

As shown by reference number 520, the second UE 120 may respond to the intended maneuver message with a reviewed maneuver message. The reviewed maneuver message may indicate whether the intended maneuver for the target road resource indicated in the intended maneuver message is accepted by the second UE 120 or rejected by the second UE 120. The second UE 120 may determine whether to accept or reject the intended maneuver for the target road resource based at least in part on determining whether there is a risk of a collision between the vehicle associated with the second UE 120 (e.g., a remote vehicle) and the vehicle associated with the first UE 120 (e.g., the host vehicle). That is, the second UE 120 may review the intended maneuver with the target road resource and may determine a likelihood of a collision between the remote vehicle of the second UE 120 and the host vehicle of the first UE 120 if the host vehicle were to execute the intended maneuver. If the second UE 120 determines that there is no likelihood or a low likelihood of a collision between the remote vehicle of the second UE 120 and the host vehicle of the first UE 120 if the host vehicle were to execute the intended maneuver, the second UE 120 may transmit a reviewed maneuver message indicating an acceptance of the intended maneuver message. Conversely, if second UE 120 determines that there is a likelihood or a high likelihood of a collision between the remote vehicle of the second UE 120 and the host vehicle of the first UE 120 if the host vehicle were to execute the intended maneuver, the second UE 120 may transmit a reviewed maneuver message indicating a rejection of the intended maneuver message.

As shown by reference number 525, the third UE 120 respond to the intended maneuver message with a reviewed maneuver message. The reviewed maneuver message may indicate whether the intended maneuver for the target road resource indicated in the intended maneuver message is accepted by the third UE 120 or rejected by the third UE 120. The third UE 120 may determine whether to accept or reject the intended maneuver message in a similar manner as described above with respect to the second UE 120.

The first UE 120 may analyze a reviewed maneuver message to determine a UE 120 and/or a vehicle associated with the reviewed maneuver message. The first UE 120 may analyze a reviewed maneuver message to determine if the reviewed maneuver message was sent by a UE 120 included in the set of one or more UEs 120 for the intended maneuver. In some aspects, the first UE 120 may determine a UE 120 and/or a vehicle associated with the reviewed maneuver message based at least in part on a vehicle identifier indicated in the reviewed maneuver message.

In some aspects, the first UE 120 may determine a UE 120 and/or a vehicle associated with the reviewed maneuver message based at least in part on information of a UE 120 sending the reviewed maneuver message and the tracked and/or maintained information related to the UEs 120 included in the set of one or more UEs 120 for the intended maneuver. For example, in some cases, a vehicle identifier of a remote vehicle may be changed (e.g., for security purposes and/or the like). As a result, the vehicle identifier indicated in a reviewed maneuver message may be associated with a UE 120 included in the set of one or more UEs 120 for the intended maneuver, but the vehicle identifier may be different than what is tracked and/or maintained by the first UE 120. The first UE 120 may determine whether the reviewed maneuver message is sent from a UE 120 included in the set of one or more UEs 120 for the intended maneuver based at least in part on location and/or dynamic information associated with UE 120 that transmits the reviewed maneuver message.

For example, the UE 120 may compare the location and/or dynamic information associated with UE 120 that transmits the reviewed maneuver message to the tracked and/or maintained information for the set of one or more UEs 120 for the intended maneuver. The first UE 120 may determine a tracking error between the location and/or dynamic information associated with UE 120 that transmits the reviewed maneuver message and the tracked and/or maintained information for the set of one or more UEs 120 for the intended maneuver to determine if the UE 120 that transmitted the reviewed maneuver message is included in the set of one or more UEs 120 for the intended maneuver. The first UE 120 may determine the tracking error using equation 1 and/or equation 2, shown below:

$$TE_{ik}(t) = \text{Distance}[D\{POS_i(t)\}, D\{ePOS_k(t)\}] \quad \text{Equation 1}$$

$$D\{ePOS_k(t)\} = D\{POS_k(t_0)\} + \{\cos HD_k(t_0), \sin HD_k(t_0))\} * SP_k(t_0) * (t-t_0)\} \quad \text{Equation 2}$$

where $TE_{ik}(t)$ is the tracking error, in units of meters, between an estimated location of a vehicle indicated in the tracked and/or maintained information for the set of one or more UEs 120 for the intended maneuver (e.g., k) at a time when the reviewed maneuver message is received by the first UE 120 (e.g., t) and a vehicle associated with a UE 120 that transmits a reviewed maneuver message (e.g., i). Distance [x, y] is a Euclidean distance between two 2D positions, x and y (in units of meters), $POS_i(t)$ is a position of the vehicle associated with a UE 120 that transmits a reviewed maneuver message at time t. $POS_k(t_0)$ is a position of a UE 120 in the set of one or more UEs 120 for the intended maneuver indicated in a most recent BSM or SSM received and maintained by the first UE 120 in latitude and longitude (e.g., where $t_0$ is the time at which the BSM or SSM is received). $ePOS_k(t)$ is an estimated position of UE 120 in the set of one or more UEs 120 for the intended maneuver in latitude and longitude. D{latitude, longitude} is a transformation of latitude and longitude values to meter units. $SP_k(t_0)$ is a speed of the vehicle of the UE 120 in the set of one or more UEs 120 for the intended maneuver indicated in a most recent BSM or SSM received and maintained by the first UE 120 in meters per second. $HD_k(t_0)$ is a heading of the vehicle of the UE 120 in the set of one or more UEs 120 for the intended maneuver indicated in a most recent BSM or SSM received and maintained by the first UE 120 in units of degrees from 0 degrees to 360 degrees.

In some aspects, the first UE 120 may determine that a UE 120 that transmits a reviewed maneuver message is a same UE 120 that is included in the set of one or more UEs 120 for the intended maneuver based at least in part on the tracking error (e.g., determined as described above) satisfying a threshold value (e.g., 1 meter and/or the like). In this way, the first UE 120 may determine that a reviewed maneuver message is received from a UE 120 that is included in the set of one or more UEs 120 for the intended maneuver where the UE 120 has changed an identifier associated with the UE 120 or the vehicle of the UE 120.

As shown by reference number 530, the first UE 120 may determine a grant condition has been satisfied. For example, the first UE 120 may determine a grant condition has been satisfied if the first UE 120 has received a reviewed maneuver message indicating an acceptance of the intended maneuver message from each UE 120 included in the set of one or more UEs 120 for the intended maneuver and the first UE 120 has not received a reviewed maneuver message indicating a rejection of the intended maneuver message from any other UE 120.

If the first UE 120 determines that the grant condition has not been satisfied, the first UE 120 may return to the pre-awareness state (e.g., exchanging BSMs and/or SSMs) or the preparation state (e.g., determining a new set of one or more UEs 120 for the intended maneuver). In this way, the first UE 120 may enter a new negotiation for a new intended maneuver if the initial maneuver has been rejected (e.g., the grant condition has not been satisfied). In this way, the negotiations for intended maneuvers may be simplified, conserving time and/or processing resources that would have otherwise been used performing additional actions after determining that the initial maneuver has been rejected.

As shown by reference number 535, if the first UE 120 determines that the grant condition for the intended maneuver has been satisfied, the first UE 120 may transmit a granted maneuver message indicating the granted maneuver and the target road resource associated with the granted maneuver. The first UE 120 may transmit the granted maneuver message using a broadcast transmission.

As shown by reference number 540, in some aspects, the first UE 120 may receive a cancellation message from the second UE 120. For example, the second UE 120, after transmitting the reviewed maneuver message indicating an acceptance of the intended maneuver message, may determine that the vehicle associated with the second UE 120 can no longer conform to the granted maneuver (e.g., due to a change in the environment of the vehicle of the second UE 120, and/or a change in the dynamic information (e.g., heading, speed, acceleration, and/or the like) of the vehicle of the second UE 120). The second UE 120 may transmit the cancellation message based at least in part on determining that the vehicle associated with the second UE 120 can no longer conform to the intended maneuver. Any other UEs 120 (e.g., the third UE 120, the fourth UE 120, and/or the like) may transmit a cancellation message to the first UE 120 in a similar manner. While the cancellation message is shown as being transmitted after the grant condition is satisfied, a UE 120 (e.g., the first UE 120, the second UE 120, the third UE 120, and/or the fourth UE 120) may transmit a cancellation message at any time (e.g., during the maneuver negotiation) in a similar manner as described herein.

In some aspects, the first UE 120, after transmitting the granted maneuver message, may determine that the vehicle associated with the first UE 120 (e.g., the host vehicle) can no longer conform to the granted maneuver. The UE 120 may transmit a cancellation message indicating a cancellation of the granted maneuver. The UE 120 may transmit the cancellation message using a broadcast transmission. Transmitting the cancellation message may cause the first UE 120 and/or other UEs 120 receiving the cancellation message to return to the pre-awareness state or the preparation state.

As shown by reference number 545, the first UE 120 may transmit a cancellation message indicating a cancellation of the granted maneuver based at least in part on receiving the cancellation message from the second UE 120. The cancellation message transmitted by the first UE 120 may indicate to all other UEs 120 (e.g., the third UE 120, the fourth UE 120, and/or the like) that the granted maneuver has been canceled. This may enable the other UEs 120 to use the target road resource of the granted maneuver for other purposes (e.g., other maneuvers and/or the like).

As shown by reference number 550, no further actions may be performed by the first UE 120 based at least in part on receiving the cancellation message from the second UE 120 and/or based at least in part on transmitting the cancellation message. As a result, the first UE 120 may return to the pre-awareness state or the preparation state. If the first UE 120 does not receive or transmit any cancellation messages within a predefined amount of time after transmitting the granted maneuver message, the first UE 120 may execute the granted maneuver (e.g., cause the host vehicle to execute the granted maneuver, indicate to a driver of the host vehicle to execute the granted maneuver, and/or the like).

As indicated above, FIG. 5 is provided as an example. Other examples may differ from what is described with respect to FIG. 5.

Figure 6:
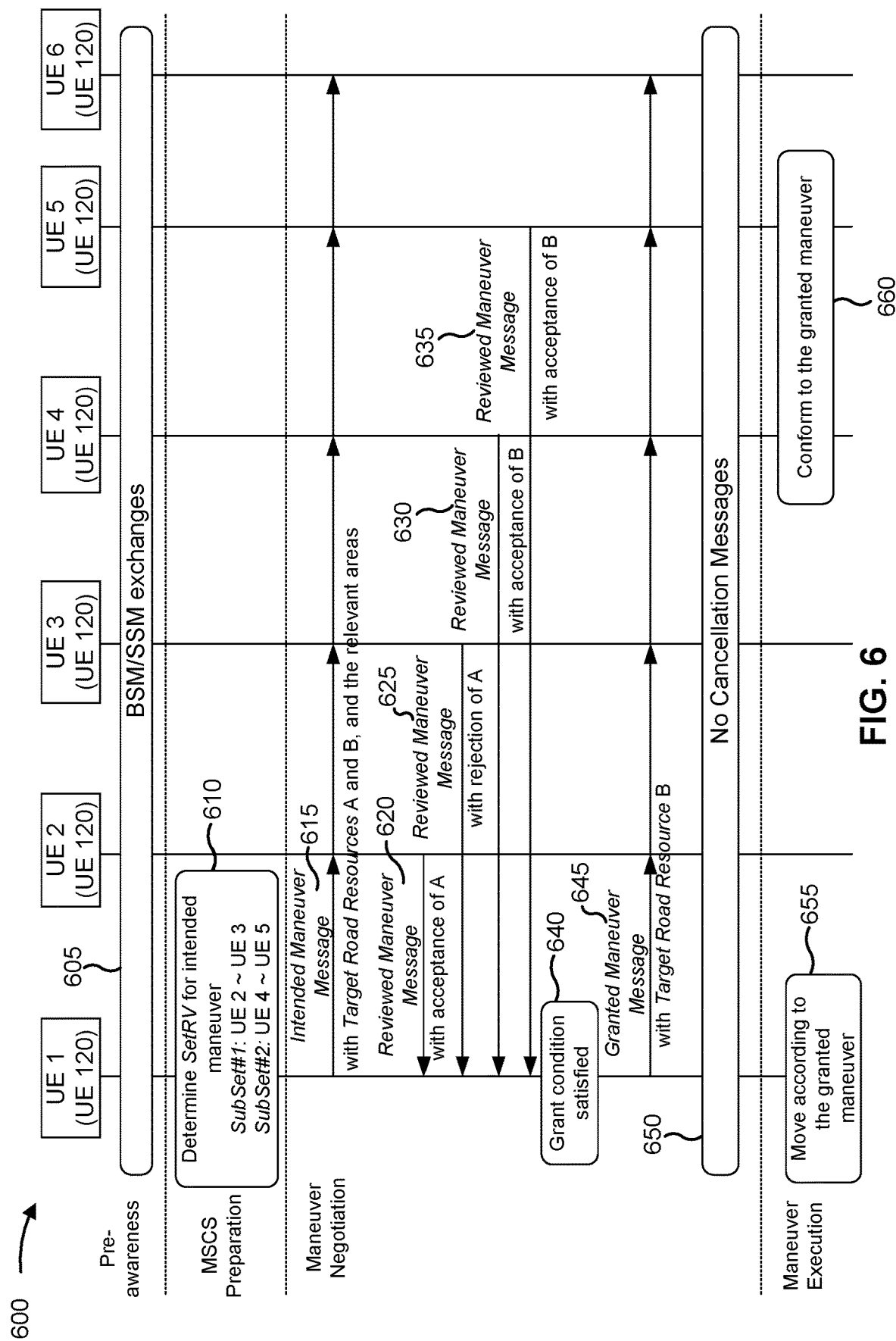

FIG. 6 is a diagram illustrating an example 600 of V2V maneuver sharing and coordinating, in accordance with the present disclosure. As shown in FIG. 6, one or more UEs 120 may communicate with one another. Each UE 120 may be associated with a vehicle. For example, a first UE 120 (e.g., UE 1) may be associated with a host vehicle (e.g., a vehicle that is initiating a maneuver). The remaining UEs 120 (e.g., UE 2, UE 3, UE 4, UE 5, UE 6, and/or the like) may be associated with remote vehicles (e.g., vehicles that are involved in the negotiation of the maneuver with the host vehicle). As described herein, communications between a host vehicle and one or more remote vehicles may refer to communications between a UE 120 of the host vehicle and UEs 120 of the one or more remote vehicles.

As show by reference number 605, in a pre-awareness state, the UEs 120 may exchange BSMs, and/or SSMs, among other examples. The UEs 120 in the pre-awareness state may operate in a similar manner as described above with respect to FIG. 5 (e.g., the BSMs and/or the SSMs may include similar information and may be exchanged in a similar manner).

As shown by reference number 610, the first UE 120 (e.g., of the host vehicle) may determine a set of one or more UEs 120 (e.g., a set of one or more remote vehicles, SetRV) for an intended maneuver (e.g., an intended maneuver to be performed by the host vehicle). During this time, the first UE 120 may be in a preparation state (e.g., an MSCS preparation state). The intended maneuver may indicate multiple target road resources (e.g., target road resource A and target road resource B) associated with the maneuver. The set of one or more UEs 120 for the intended maneuver may include one or more subsets of UEs 120 associated with a target road resource of the multiple target road resources. For example, the first UE 120 may determine a first subset of UEs 120 associated with target road resource A and a second subset of UEs 120 associated with target road resource B. The first UE 120 may determine a subset of UEs 120 associated with a target road resource in a similar manner as described above with respect to FIG. 5 (e.g., using a relevant area associated with the target road resource).

As shown in FIG. 6, the first subset of UEs 120 associated with target road resource A may include the second UE 120 and the third UE 120. The second subset of UEs 120 associated with target road resource B may include the fourth UE 120 and the fifth UE 120. As a result, the first UE 120 may determine that the set of one or more UEs 120 for the intended maneuver may include the second UE 120, the third UE 120, the fourth UE 120, and the fifth UE 120. As described above with respect to FIG. 5, the first UE 120 may track and/or maintain information related to the UEs 120 included in the set of one or more UEs 120 for the intended maneuver until the end of a negotiation state associated with the intended maneuver. In some aspects, the multiple target road resources (e.g., target road resource A and target road resource B) may be associated with sub-maneuvers of a maneuver indicated by the intended maneuver message.

As shown by reference number 615, the first UE 120 may transmit an intended maneuver message indicating the intended maneuver, target road resource A, target road resource B, the relevant area of target road resource A, and/or the relevant area of target road resource B. The first UE 120 may transmit the intended maneuver message in a similar manner as described above with respect to FIG. 5.

The first UE 120 may indicate target road resource A and target road resource B in the intended maneuver message in a similar manner as described above with respect to FIG. 5. Similarly, the UE 120 may indicate the relevant areas, one or more maneuver types, and/or the like in the intended maneuver message.

One or more UEs 120 that receive the intended maneuver message may determine whether to respond to the intended maneuver, as described above with respect to FIG. 5. Additionally, if the UE 120 that received the intended maneuver message determines that the UE 120 should respond, the UE 120 may determine which target road resource indicated in the intended maneuver message the response should be associated with. For example, as shown in FIG. 6, the second UE 120 may receive the intended maneuver message (e.g., indicating target road resource A and target road resource B). The second UE 120 may determine that the second UE 120 is located in the relevant area associated with target road resource A but is not in the relevant area associated with target road resource B. As a result, the second UE 120 may transmit a response to the first UE 120 associated with target road resource A, but may not transmit a response to the first UE 120 associated with target road resource B. The sixth UE 120 may determine that the sixth UE 120 is not in the relevant area associated with target road resource A and may determine that the sixth UE 120 is not in the relevant area associated with target road resource B. As a result, the sixth UE 120 may ignore the intended maneuver message.

As shown by reference number 620, the second UE 120 may transmit a reviewed maneuver message indicating an acceptance of the intended maneuver associated with target road resource A. As shown by reference number 625, the third UE 120 may transmit a reviewed maneuver message indicating a rejection of the intended maneuver associated with target road resource A. As shown by reference number 630, the fourth UE 120 may transmit a reviewed maneuver message indicating an acceptance of the intended maneuver associated with target road resource B. As shown by reference number 635, the fifth UE 120 may transmit a reviewed maneuver message indicating an acceptance of the intended maneuver associated with target road resource B. The UEs 120 that respond to the intended maneuver message may determine whether to accept or reject the intended maneuver indicated in the intended maneuver message in a similar manner as described above with respect to FIG. 5.

The first UE 120 may determine a UE 120 and/or a vehicle associated with the reviewed maneuver message based at least in part on information of a UE 120 sending the reviewed maneuver message and the tracked and/or maintained information related to the UEs 120 included in the set of one or more UEs 120 for the intended maneuver. For example, in some cases, a vehicle identifier of a remote vehicle may be changed (e.g., for security purposes). As a result, the vehicle identifier indicated in a reviewed maneuver message may be associated with a UE 120 included in the set of one or more UEs 120 for the intended maneuver, but the vehicle identifier may be different than what is tracked and/or maintained by the first UE 120. The first UE 120 may determine whether the reviewed maneuver message is sent from a UE 120 included in the set of one or more UEs 120 for the intended maneuver based at least in part on location and/or dynamic information associated with UE 120 that transmits the reviewed maneuver message.

For example, the UE 120 may compare the location and/or dynamic information associated with UE 120 that transmits the reviewed maneuver message to the tracked and/or maintained information for the set of one or more UEs 120 for the intended maneuver. The first UE 120 may determine a tracking error between the location and/or dynamic information associated with UE 120 that transmits the reviewed maneuver message and the tracked and/or maintained information for the set of one or more UEs 120 for the intended maneuver to determine if the UE 120 that transmitted the reviewed maneuver message is included in the set of one or more UEs 120 for the intended maneuver. The first UE 120 may determine the tracking error as described above with respect to FIG. 5 (e.g., using equation 1 and/or equation 2). As a result, the first UE 120 may determine if a received reviewed maneuver message is from a UE 120 included in the set of one or more UEs 120 for the intended maneuver, included in a subset of UEs 120 associated with a target road resource, and/or the like.

As shown by reference number 640, the first UE 120 may determine if a grant condition has been satisfied for an intended maneuver of one or more target road resources. For example, the UE 120 may determine if a grant condition has been satisfied for target road resource A (e.g., if the first UE 120 has received a reviewed maneuver message from each UE 120 in the first subset of UEs 120 and has not received any reviewed maneuver messages indicating a rejection of the intended maneuver for target road resource A). Similarly, the UE 120 may determine if a grant condition has been satisfied for target road resource B (e.g., if the first UE 120 has received a reviewed maneuver message from each UE 120 in the second subset of UEs 120 and has not received any reviewed maneuver messages indicating a rejection of the intended maneuver for target road resource B). If the first UE 120 determines that a grant condition has not been satisfied for any target road resources indicated in the intended maneuver message, the first UE 120 may return to the pre-awareness state or the preparation state and may perform no further actions with respect to the negation state.

As shown in FIG. 6, the first UE 120 may receive a reviewed maneuver message indicating a rejection of the intended maneuver for target road resource A from the third UE 120. As a result, the first UE 120 may determine that a grant condition for target road resource A has not been satisfied. The first UE 120 may receive reviewed maneuver messages indicating an acceptance of the intended maneuver for target road resource B from the fourth UE 120 and the fifth UE 120 (e.g., the UEs 120 included in the second subset). Additionally, the first UE 120 may not receive any reviewed maneuver messages from any other UEs 120 indicating a rejection of the intended maneuver for target road resource B. As a result, the first UE 120 may determine that a grant condition for target road resource B has been satisfied.

As shown by reference number 645, the first UE 120 may transmit a granted maneuver message indicating the granted maneuver for target road resource B. The transmission of the granted maneuver message indicating the granted maneuver for target road resource B may be a broadcast transmission.

As shown by reference number 650, the first UE 120 may not receive any cancellation messages associated with the granted maneuver for target road resource B for a first period of time from the time the UE 120 transmits the granted maneuver message. Similarly, the first UE 120 may not transmit any cancellation messages associated with the granted maneuver for target road resource B for a second period of time from the time the UE 120 transmits the granted maneuver message. If the first UE 120 does not receive any cancellation messages associated with the granted maneuver for target road resource B for the first period of time and does not transmit any cancellation messages associated with the granted maneuver for target road resource B for the second period of time, the first UE 120 may transition to a maneuver execution state.

As shown by reference number 655, during the maneuver execution state, the first UE 120 may cause the host vehicle to move according to the granted maneuver (e.g., may cause the vehicle to move, and/or may provide an indication to a diver of the host vehicle). For example, the first UE 120 may cause the host vehicle to perform the granted maneuver using target road resource B.

As shown by reference number 660, the fourth UE 120 and the fifth UE 120 may conform to the granted maneuver. For example, the fourth UE 120 and the fifth UE 120 may cause the remote vehicles associated with the fourth UE 120 and the fifth UE 120 to allow the host vehicle to execute the granted maneuver using target road resource B.

As a result, the UEs 120 (e.g., the first UE 120 of the host vehicle and one or more UEs 120 of one or more remote vehicles) may efficiently share and coordinate maneuvers between each other. This may conserve network resources, processing resources, and/or the like that would have otherwise been used negotiating the maneuvers without using dynamic information and contextual information, without allowing multiple target road resources to be indicated in an initial maneuver request from a UE 120 of a host vehicle, and/or the like.

As indicated above, FIG. 6 is provided as an example. Other examples may differ from what is described with respect to FIG. 6.

Figure 7:
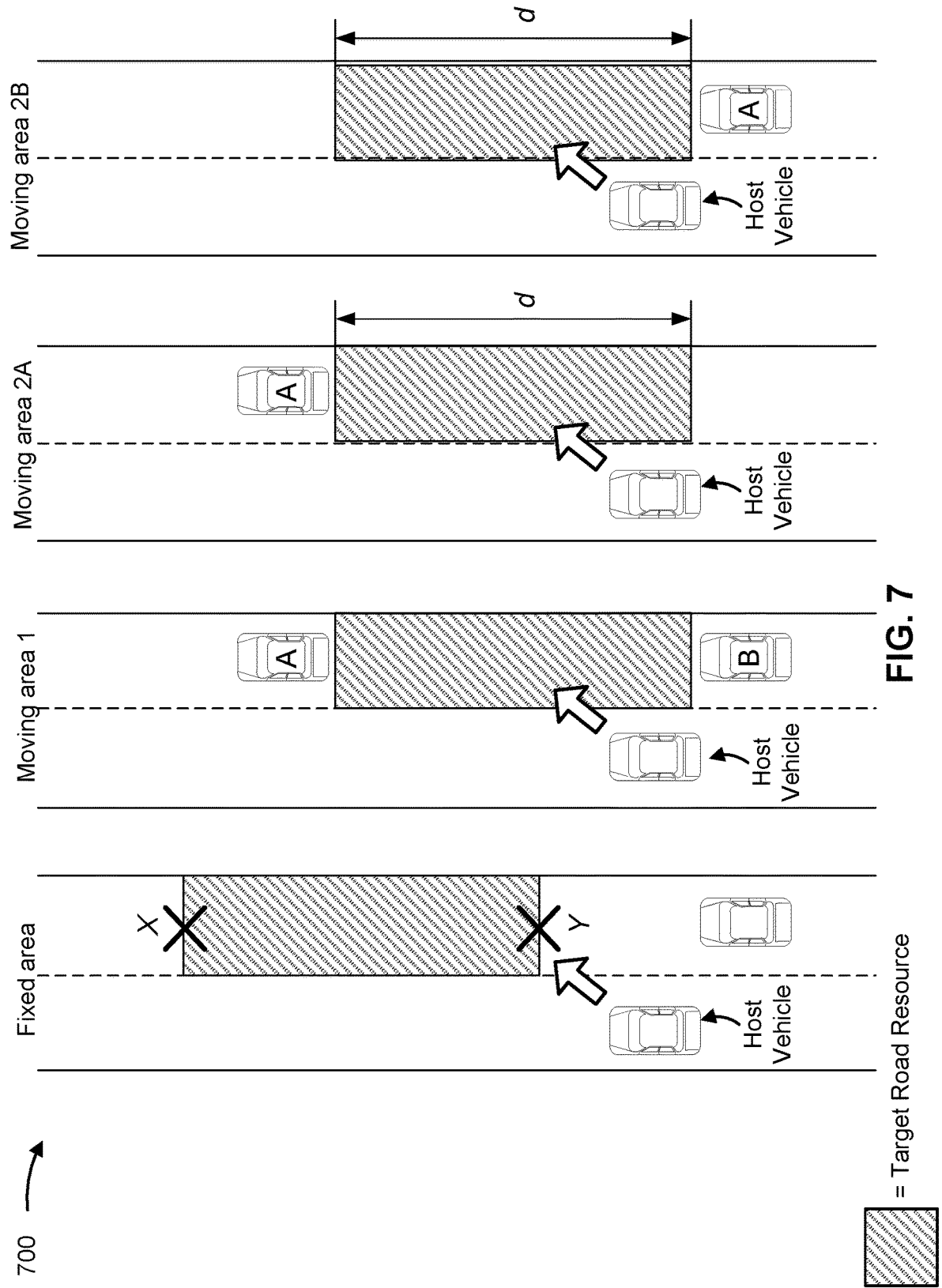

FIG. 7 is a diagram illustrating an example 700 associated with V2V maneuver sharing and coordinating, in accordance with the present disclosure. As shown in FIG. 7, example 700 includes a host vehicle (e.g., associated with a UE 120) and one or more moving vehicles traveling on a road.

The UE 120 of the host vehicle may initiate a maneuver (e.g., a movement on the road). For example, as shown in FIG. 7, the maneuver may be a lane change maneuver. The maneuver may be associated with a target road resource (e.g., an area of the road to be used for the maneuver). The UE 120 of the host vehicle may define the target road resource as a fixed area and/or as a moving area.

For example, as shown in FIG. 7, the UE 120 of the host vehicle may determine a rear location of the target road resource, Y (e.g., in latitude and longitude). The UE 120 may determine a front location of the target road resource, X (e.g., in latitude and longitude). In some aspects, the UE 120 may indicate a midpoint position of the target road resource and a distance from the midpoint position to the front location and the rear location of the target road resource. The UE 120 may determine a width of the target road resource. In some aspects, the width of the target road resource may correspond to a width of a lane of the road the host vehicle is traveling on.

In some aspects, the UE 120 of the host vehicle may define the target road resource as a moving area. For example, the UE 120 may use one or more contextual indications to define the target road resource. In some aspects, the UE 120 may use one or more moving vehicles on the road to define the target road resource. For example, the UE 120 may determine that the target road resource is to be between 2 moving vehicles (e.g., moving area 1), after a moving vehicle (e.g., moving area 2A), or before a moving vehicle (e.g., moving area 2B).

The UE 120 may define the target road resource in moving area 1 by defining the front location of the target road resource using a vehicle identifier of moving vehicle A and a position (e.g., in latitude and longitude) of moving vehicle A. Similarly, the UE 120 may define the rear location of the target road resource using a vehicle identifier of moving vehicle B and a position (e.g., in latitude and longitude) of moving vehicle B.

The UE 120 may define the target road resource in moving area 2A by providing an indication that moving vehicle A is to be used to define the front location of the target road resource. The UE 120 may define the front location of the target road resource using a vehicle identifier of moving vehicle A and a position (e.g., in latitude and longitude) of moving vehicle A. The UE 120 may define the rear location of the target road resource using a distance identifier indicating a distance from the position of the moving vehicle A to the rear location of the target road resource (e.g., "d" as shown in FIG. 7).

The UE 120 may define the target road resource in moving area 2B by providing an indication that moving vehicle A is to be used to define the rear location of the target road resource. The UE 120 may define the rear location of the target road resource using a vehicle identifier of moving vehicle A and a position (e.g., in latitude and longitude) of moving vehicle A. The UE 120 may define the front location of the target road resource using a distance identifier indicating a distance from the position of the moving vehicle A to the front location of the target road resource (e.g., "d" as shown in FIG. 7).

As described above with respect to FIGS. 5 and 6, the UE 120 may define the target road resource using (or associated with target road resource with) temporal information (e.g., an earliest time associated with the target road resource and/or a latest time associated with the target road resource), size information (e.g., length, width, height, and/or radius), location information, (e.g., latitude, longitude, and/or elevation), and/or motion information (e.g., a heading, a speed, and/or an acceleration). The UE 120 may indicate the information described herein in an intended maneuver message that is transmitted or broadcast to one or more other UEs 120.

As indicated above, FIG. 7 is provided as an example. Other examples may differ from what is described with respect to FIG. 7.

Figure 8:
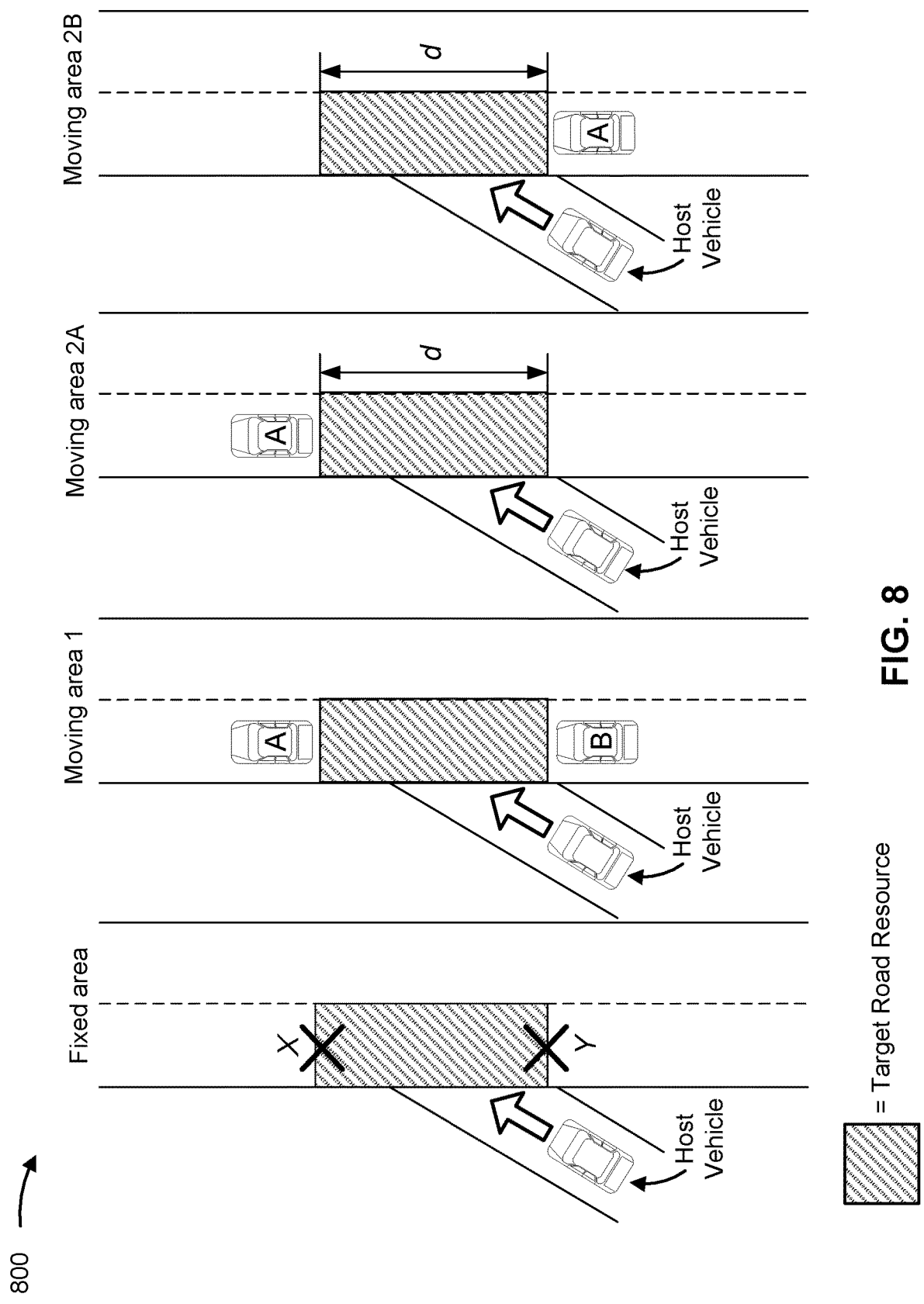

FIG. 8 is a diagram illustrating an example 800 associated with V2V maneuver sharing and coordinating, in accordance with the present disclosure. As shown in FIG. 8, example 800 includes a host vehicle (e.g., associated with a UE 120) and one or more moving vehicles traveling on a road.

The UE 120 of the host vehicle may initiate a maneuver (e.g., a movement on the road). For example, as shown in FIG. 8, the maneuver may be a merging maneuver. The maneuver may be associated with a target road resource (e.g., an area of the road to be used for the maneuver). The UE 120 of the host vehicle may define the target road resource as a fixed area and/or as a moving area.

As shown in FIG. 8, the UE 120 may define the target road resource as a fixed area, a moving area 1 (e.g., between 2 moving vehicles), a moving area 2A (e.g., after a moving vehicle), or a moving area 2B (e.g., before a moving vehicle). The UE 120 may determine the front location, the rear location, and/or the width of the fixed area target road resource, the moving location 1 target road resource, the moving location 2A target road resource, and/or the moving location 2B target road resource in a similar manner as described above with respect to FIG. 7.

As described above with respect to FIGS. 5-7, the UE 120 may define the target road resource using (or associated with target road resource with) temporal information (e.g., an earliest time associated with the target road resource and/or a latest time associated with the target road resource), size information (e.g., length, width, height, and/or radius), location information, (e.g., latitude, longitude, and/or elevation), and/or motion information (e.g., a heading, a speed, and/or an acceleration). The UE 120 may indicate the information described herein in an intended maneuver message that is transmitted or broadcast to one or more other UEs 120. Additionally, the UE 120 may indicate in the intended maneuver message that a maneuver type is a merging maneuver type, a leaving or joining traffic maneuver type, and/or the like.

As indicated above, FIG. 8 is provided as an example. Other examples may differ from what is described with respect to FIG. 8.

Figure 9:
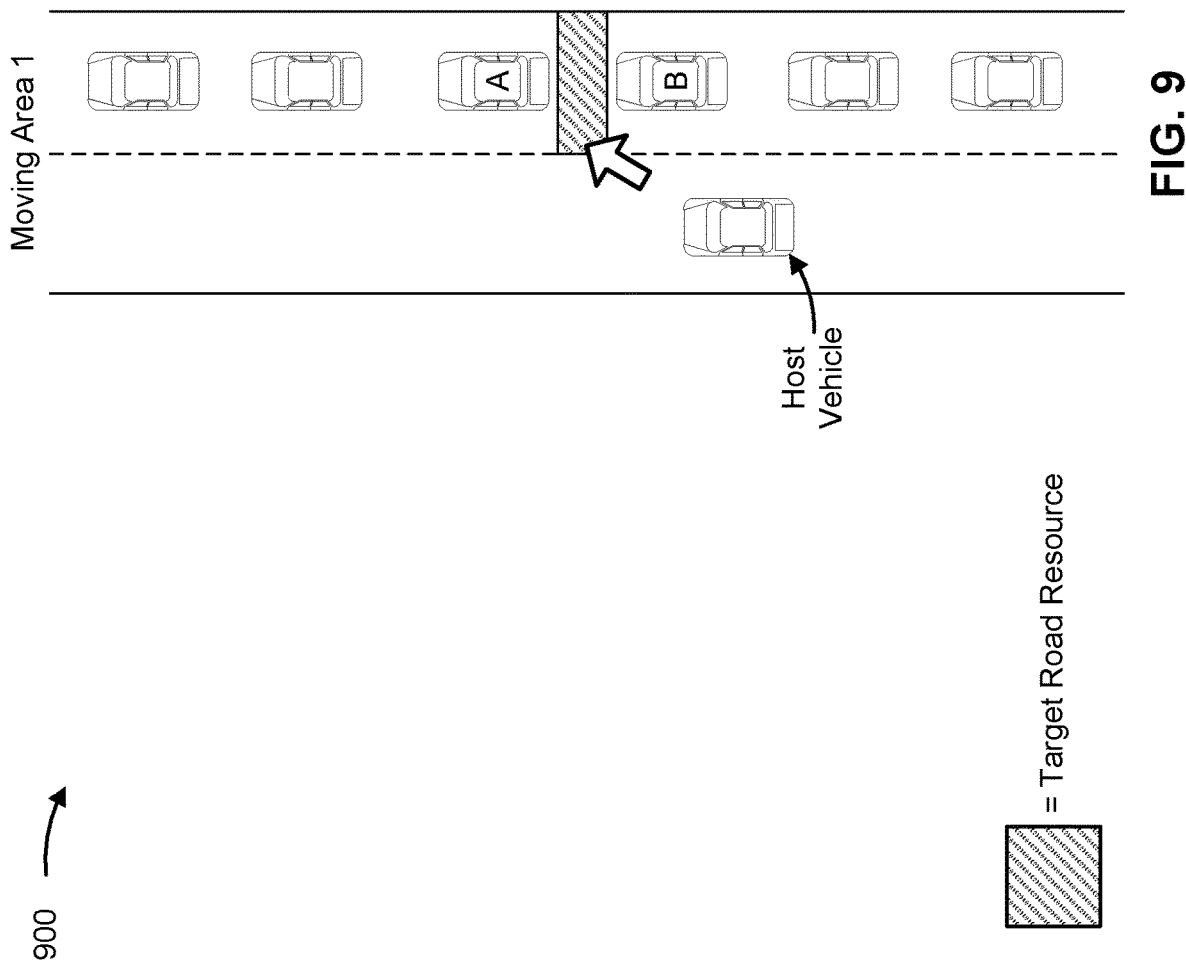

FIG. 9 is a diagram illustrating an example 900 associated with V2V maneuver sharing and coordinating, in accordance with the present disclosure. As shown in FIG. 9, example 900 includes a host vehicle (e.g., associated with a UE 120) and one or more moving vehicles traveling on a road.

As shown in FIG. 9, the UE 120 of the host vehicle may determine a target road resource of an intended maneuver as being between moving vehicle A and moving vehicle B (e.g., defined as a moving area 1, as described above with respect to FIGS. 7 and 8). The UE 120 may transmit an intended maneuver message indicating an intended maneuver of changing lanes into the area of the road defined by the target road resource. The intended maneuver message may indicate the target road resource, and a maneuver type of lane changing, leaving and joining traffic, and/or cut-in/squeeze in.

In some aspects, UEs 120 of the moving vehicle A and the moving vehicle B may receive the intended maneuver message and determine that the moving vehicles are to respond to the intended maneuver message (e.g., based at least in part on determining a relevant area associated with the target road resource, confirming that the UEs 120 are located within the relevant area, and/or receiving the intended maneuver message via a groupcast transmission).

In some aspects, the UE 120 of vehicle A and/or the UE 120 of vehicle B may determine that the response to the intended maneuver message should indicate a rejection of the intended maneuver using the target road resource. For example, the UE 120 of vehicle A and/or the UE 120 of vehicle B may determine that if the host vehicle were to execute the intended maneuver using the target road resource, a collision with vehicle A and/or vehicle B would be likely (e.g., as the target road resource is not large enough to execute the intended maneuver). However, the maneuver type indicated in the intended maneuver message may indicate a priority associated with the intended maneuver. For example, the maneuver type of cut-in/squeeze in may indicate a high priority maneuver that must be completed by the UE 120 (e.g., due to another upcoming maneuver, and/or due to an emergency situation on the road). The UE 120 of vehicle A and/or the UE 120 of vehicle B may determine that the response to the intended maneuver message should indicate an acceptance of the intended maneuver based at least in part on the maneuver type indicated in the intended maneuver message. The UE 120 of vehicle A and/or the UE 120 of vehicle B may determine one or more actions to perform to allow the host vehicle to execute the intended maneuver with a high priority maneuver type that would have otherwise been rejected. For example, the action may be to cause vehicle A and/or vehicle B to change speeds (e.g., to cause vehicle B to slow down and/or to cause vehicle A to speed up), and/or to cause vehicle A and/or vehicle B to change lanes, among other examples.

As a result, the host vehicle may be enabled to execute a maneuver that would have otherwise been rejected by one or more remote vehicles (e.g., vehicle A and/or vehicle B). The maneuver type may provide additional context to a remote vehicle to enable the remote vehicle to accept high priority maneuvers that may otherwise be rejected by the remote vehicle.

As indicated above, FIG. 9 is provided as an example. Other examples may differ from what is described with respect to FIG. 9.

Figure 10:
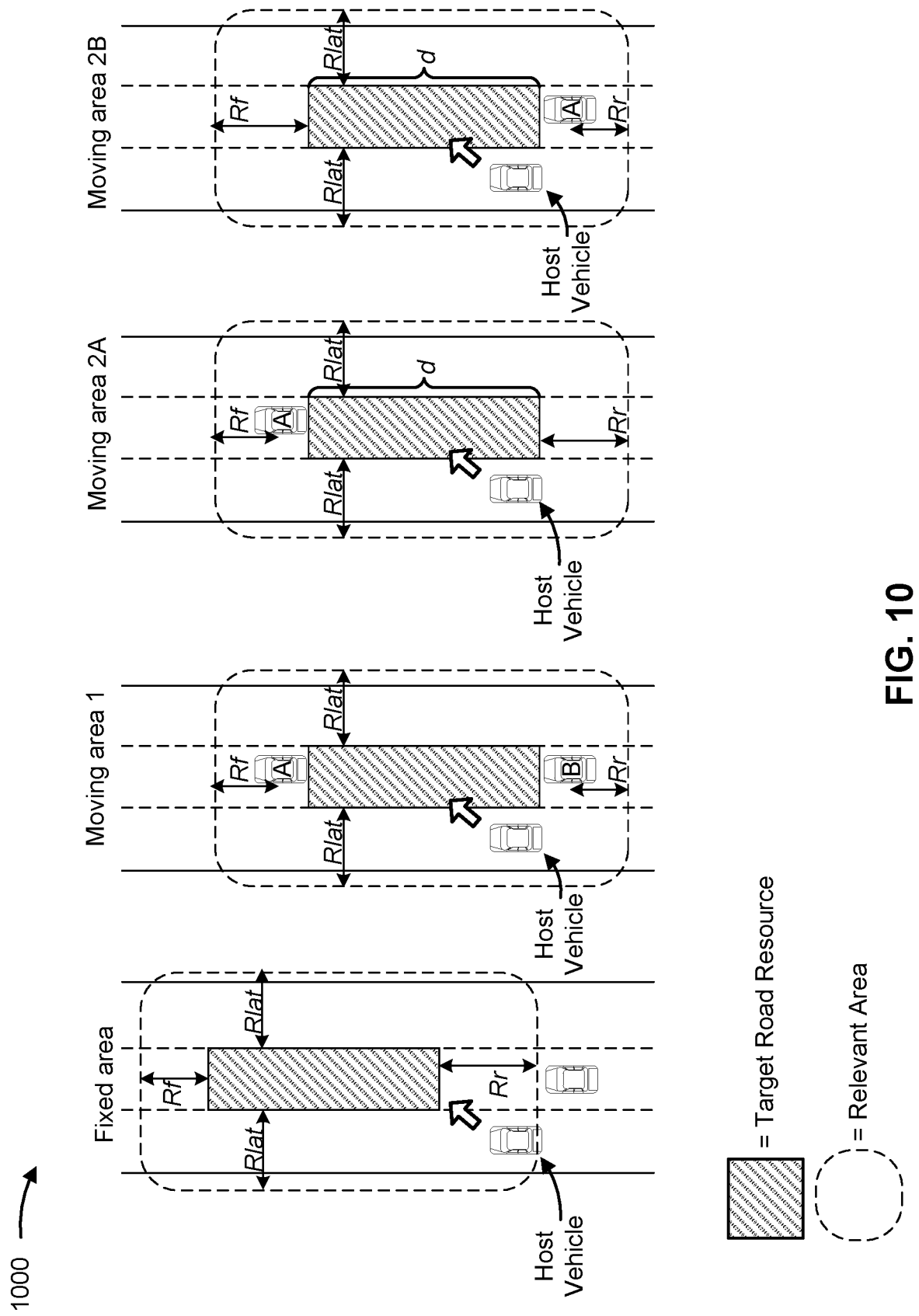

FIG. 10 is a diagram illustrating an example 1000 associated with V2V maneuver sharing and coordinating, in accordance with the present disclosure. As shown in FIG. 10, example 1000 includes a host vehicle (e.g., associated with a UE 120) and one or more moving vehicles traveling on a road.

As described above, the host vehicle may transmit an intended maneuver message that indicates an intended maneuver, a target road resource, a maneuver type, and/or the like. For example, the intended maneuver message may indicate a fixed area target road resource, a moving area 1 target road resource, a moving area 2A target road resource, and/or a moving area 2B target road resource (e.g., as described above with respect to FIGS. 7 and 8). The UE 120 of the host vehicle and/or one or more other UEs 120 of remote vehicles may be enabled to determine a relevant area (e.g., the relevant area described above with respect to FIGS. 5 and 6) for each type of target road resource. For example, a UE 120 (e.g., of a host vehicle or a remote vehicle) may determine a relevant area associated with a target road resource based at least in part on a distance ahead of the target road resource (e.g., Rf, a distance from the front location of the target road resource to the front location of the relevant area), a distance behind the target road resource (e.g., Rr, a distance from the rear location of the target road resource to the rear location of the relevant area), and a distance on each side of the target road resource (e.g., Rlat).

A UE 120 may determine the distance on each side of the target road resource (e.g., Rlat) based at least in part on a width of a lane of a road on which a vehicle associated with the UE 120 is traveling for the fixed area target road resource, the moving area 1 target road resource, the moving area 2A target road resource, and/or the moving area 2B target road resource. In some aspects, the distance on each side of the target road resource may be the width of a lane of a road on which a vehicle associated with the UE 120 is traveling (e.g., 4 meters and/or other distances).

For a fixed area target road resource, the UE 120 may determine the distance ahead of the target road resource based at least in part on a reaction time associated with the host vehicle and a maximum speed associated with the target road resource (e.g., determined by the UE 120 of the host vehicle and/or indicated in the intended maneuver message). The reaction time may be a predefined value associated with a reaction time of a driver of the host vehicle. In some aspects, the reaction time may be between 0.5 second and 3 seconds. The maximum speed associated with the target road resource may be based at least in part on a speed of the host vehicle (e.g., the maximum speed of the target road resource may be based at least in part on a maximum speed of the host vehicle when executing the intended maneuver). The UE 120 may determine the distance ahead of the target road resource by multiplying the reaction time associated with the host vehicle (e.g., in seconds) with the maximum speed associated with the target road resource (e.g., in meters per second) to obtain a distance (e.g., in meters).

The UE 120 may determine the distance behind the target road resource based at least in part on a difference between an end time associated with the target road resource and a current time and a maximum allowed speed of the road on which the vehicle associated with the UE 120 is traveling. For example, a target road resource may be associated with a start time of to and an end time of $t_1$. The UE 120 may determine the distance behind the target road resource by subtracting a current time from $t_1$ and multiplying the difference (e.g., in seconds) by the maximum allowed speed of the road (e.g., in meters per second) to obtain a distance (e.g., in meters).

For a moving area 1 target road resource, the UE 120 may determine the distance ahead of the target road resource based at least in part on a difference between an end time associated with the target road resource and a current time and a speed of a first moving vehicle (e.g., vehicle A). For example, the UE 120 may determine the distance ahead of the target road resource by subtracting a current time from $t_1$ and multiplying the difference (e.g., in seconds) by speed of the first moving vehicle (e.g., in meters per second) to obtain a distance (e.g., in meters). The UE 120 may determine the distance behind the target road resource based at least in part on a difference between a start time associated with the target road resource and a current time and a speed of a second moving vehicle (e.g., vehicle B). For example, the UE 120 may determine the distance behind the target road resource by subtracting to from the current time and multiplying the difference (e.g., in seconds) by the speed of the second moving vehicle (e.g., in meters per second) to obtain a distance (e.g., in meters).

For a moving area 2A target road resource, the UE 120 may determine the distance ahead of the target road resource based at least in part on a difference between an end time associated with the target road resource and a current time and a speed of a moving vehicle (e.g., vehicle A). For example, the UE 120 may determine the distance ahead of the target road resource by subtracting a current time from $t_1$ and multiplying the difference (e.g., in seconds) by the speed of the moving vehicle (e.g., in meters per second) to obtain a distance (e.g., in meters). The UE 120 may determine the distance behind the target road resource based at least in part on a difference between an end time associated with the target road resource and a current time and a maximum allowed speed of the road on which the vehicle associated with the UE 120 is traveling. For example, the UE 120 may determine the distance behind the target road resource by subtracting a current time from $t_1$ and multiplying the difference (e.g., in seconds) by the maximum allowed speed of the road (e.g., in meters per second) to obtain a distance (e.g., in meters).

For a moving area 2B target road resource, the UE 120 may determine the distance ahead of the target road resource based at least in part on a reaction time associated with the host vehicle and a maximum speed associated with the target road resource. For example, the UE 120 may determine the distance ahead of the target road resource by multiplying the reaction time associated with the host vehicle (e.g., in seconds) with the maximum speed associated with the target road resource (e.g., in meters per second) to obtain a distance (e.g., in meters). The UE 120 may determine the distance behind the target road resource based at least in part on a difference between a start time associated with the target road resource and a current time and a speed of a moving vehicle (e.g., vehicle A). For example, the UE 120 may determine the distance behind the target road resource by subtracting to from the current time and multiplying the difference (e.g., in seconds) by the speed of the moving vehicle (e.g., in meters per second) to obtain a distance (e.g., in meters).

A UE 120 of a host vehicle may indicate the relevant area in an intended maneuver message (e.g., in a type 2 broadcast transmission). In some aspects, a UE 120 of a remote vehicle may determine the relevant area for one or more target road resources indicated in an intended maneuver message. As a result, the UE 120 may be enabled to determine a relevant area for one or more types of target road resources. This may enable a UE 120 of a host vehicle to determine a set of one or more UEs 120 that are associated with an intended maneuver (e.g., one or more UEs 120 that are within the relevant area associated with a target road resource for the maneuver). Additionally, a UE 120 of a remote vehicle may be enabled to determine whether to respond to an intended maneuver request (e.g., based at least in part on determining and/or confirming that the UE 120 of the remote vehicle is within a relevant area indicated in the intended maneuver request).

As indicated above, FIG. 10 is provided as an example. Other examples may differ from what is described with respect to FIG. 10.

Figure 11:
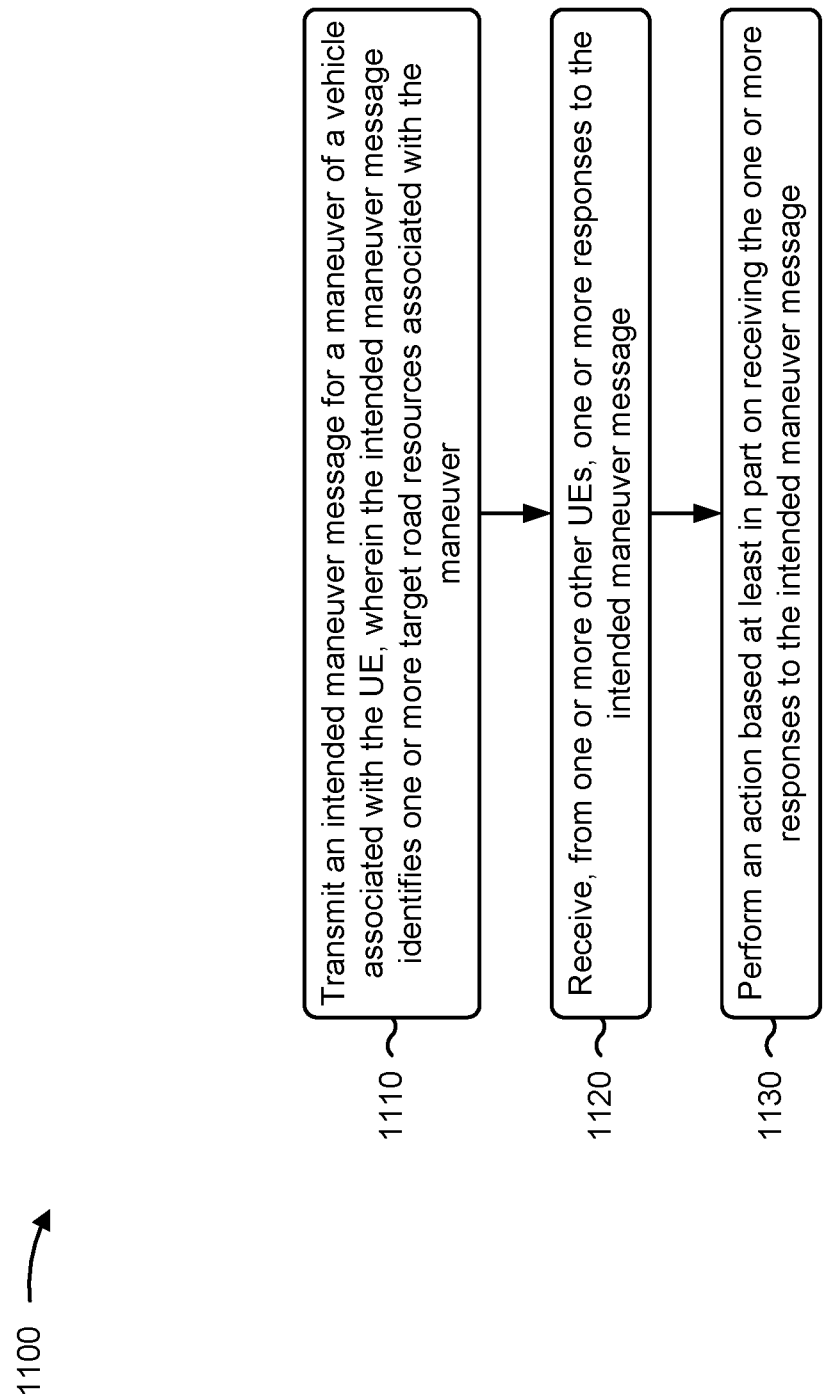
FIGS. 11 and 12 are diagrams illustrating example processes associated with V2V maneuver sharing and coordinating, in accordance with the present disclosure.

FIG. 11 is a diagram illustrating an example process 1100 performed, for example, by a UE, in accordance with the present disclosure. Example process 1100 is an example where the UE (e.g., a UE 120 as depicted in, or described in connection with, FIGS. 1-10) performs operations associated with V2V maneuver sharing and coordinating.

As shown in FIG. 11, in some aspects, process 1100 may include transmitting an intended maneuver message for a maneuver of a vehicle associated with the UE, wherein the intended maneuver message identifies one or more target road resources associated with the maneuver (block 1110). For example, the UE (e.g., using receive processor 258, transmit processor 264, controller/processor 280, memory 282, and/or the like) may transmit an intended maneuver message for a maneuver of a vehicle associated with the UE, as described above. In some aspects, the intended maneuver message identifies one or more target road resources associated with the maneuver.

As further shown in FIG. 11, in some aspects, process 1100 may include receiving, from one or more other UEs, one or more responses to the intended maneuver message (block 1120). For example, the UE (e.g., using receive processor 258, transmit processor 264, controller/processor 280, memory 282, and/or the like) may receive, from one or more other UEs, one or more responses to the intended maneuver message, as described above.

As further shown in FIG. 11, in some aspects, process 1100 may include performing an action based at least in part on receiving the one or more responses to the intended maneuver message (block 1130). For example, the UE (e.g., using receive processor 258, transmit processor 264, controller/processor 280, memory 282, and/or the like) may perform an action based at least in part on receiving the one or more responses to the intended maneuver message, as described above.

Process 1100 may include additional aspects, such as any single aspect or any combination of aspects described below and/or in connection with one or more other processes described elsewhere herein.

In a first aspect, the vehicle is a host vehicle and the one or more other UEs are associated with one or more remote vehicles.

In a second aspect, alone or in combination with the first aspect, the intended maneuver message identifies a first target road resource, and receiving one or more responses to the intended maneuver message comprises receiving one or more responses, associated with the first target road resource, indicating a rejection of the intended maneuver, and performing the action comprises returning to a pre-awareness state or a preparation state.

In a third aspect, alone or in combination with one or more of the first and second aspects, performing the action comprises transmitting a cancellation message associated with the intended maneuver message.

In a fourth aspect, alone or in combination with one or more of the first through third aspects, the intended maneuver message identifies a first target road resource and a second target road resource, and receiving, from one or more other UEs, one or more responses to the intended maneuver message comprises receiving, from a first set of one or more other UEs, a first set of one or more responses associated with the first target road resource, and receiving, from a second set of one or more other UEs, a second set of one or more responses associated with the second target road resource.

In a fifth aspect, alone or in combination with one or more of the first through fourth aspects, performing the action comprises determining that the maneuver has been granted for the first target road resource or the second target road resource based at least in part on receiving the first set of one or more responses associated with the first target road resource and the second set of one or more responses associated with the second target road resource.

In a sixth aspect, alone or in combination with one or more of the first through fifth aspects, process 1100 includes determining a set of UEs that are located within a relevant area associated with the target road resource; and determining that the set of UEs are associated with intended maneuver message based at least in part on determining that the set of UEs are located within the relevant area associated with the target road resource.

In a seventh aspect, alone or in combination with one or more of the first through sixth aspects, the intended maneuver message identifies a first target road resource and a second target road resource, and determining the set of UEs that are located within the relevant area associated with the target road resource comprises determining a first set of UEs that are located within a first relevant area associated with the first target road resource, and determining a second set of UEs that are located within a second relevant area associated with the second target road resource, and wherein the set of UEs that are associated with intended maneuver message includes the first set of UEs and the second set of UEs.

In an eighth aspect, alone or in combination with one or more of the first through seventh aspects, process 1100 includes tracking, during a negotiation state associated with the intended maneuver message, each UE of the set of UEs.

In a ninth aspect, alone or in combination with one or more of the first through eighth aspects, tracking each UE of the set of UEs comprises tracking, for a UE of the set of UEs, at least one of a vehicle identifier associated with the UE of the set of UEs, a location of the UE of the set of UEs, a heading of the UE of the set of UEs, a speed of the UE of the set of UEs, an acceleration of the UE of the set of UEs, or a combination thereof.

In a tenth aspect, alone or in combination with one or more of the first through ninth aspects, receiving, from the one or more other UEs, the one or more responses to the intended maneuver message comprises receiving, from a first other UE, a first response to the intended maneuver message, and determining that the first other UE is included in the set of UEs based at least in part on tracking each UE of the set of UEs.

In an eleventh aspect, alone or in combination with one or more of the first through tenth aspects, determining that the first other UE is included in the set of UEs is based at least in part on at least one of tracking a location of the first other UE, tracking a heading of the first other UE, tracking a speed of the first other UE, tracking an acceleration of the first other UE, or a combination thereof.

In a twelfth aspect, alone or in combination with one or more of the first through eleventh aspects, process 1100 includes determining a relevant area associated with the target road resource, wherein the relevant area is based at least in part on a distance ahead of the target road resource, a distance behind the target road resource, and a distance on each side of the target road resource.

In a thirteenth aspect, alone or in combination with one or more of the first through twelfth aspects, process 1100 includes determining the distance on each side of the target road resource based at least in part on a width of a lane of a road on which the vehicle associated with the UE is traveling.

In a fourteenth aspect, alone or in combination with one or more of the first through thirteenth aspects, process 1100 includes determining the distance ahead of the target road resource based at least in part on a reaction time associated with the vehicle and a maximum speed associated with the target road resource, wherein the maximum speed associated with the target road resource is based at least in part on a speed of the vehicle.

In a fifteenth aspect, alone or in combination with one or more of the first through fourteenth aspects, process 1100 includes determining the distance behind the target road resource based at least in part on a difference between an end time associated with the target road resource and a current time and a maximum allowed speed of a road on which the vehicle associated with the UE is traveling.

In a sixteenth aspect, alone or in combination with one or more of the first through fifteenth aspects, a front location of the target road resource is based at least in part on a location of a first moving vehicle, and a rear location of the target road resource is based at least in part on a location of a second moving vehicle, process 1100 includes determining the distance ahead of the target road resource based at least in part on a difference between an end time associated with the target road resource and a current time and a speed of the first moving vehicle, and determining the distance behind the target road resource based at least in part on a difference between a start time associated with the target road resource and a current time and a speed of the second moving vehicle.

In a seventeenth aspect, alone or in combination with one or more of the first through sixteenth aspects, a front location of the target road resource or a rear location of the target road resource is based at least in part on a location of a moving vehicle, process 1100 includes determining the distance ahead of the target road resource based at least in part on a difference between an end time associated with the target road resource and a current time and a speed of the moving vehicle, and determining the distance behind the target road resource based at least in part on a difference between a start time associated with the target road resource and a current time and a speed of the moving vehicle.

In an eighteenth aspect, alone or in combination with one or more of the first through seventeenth aspects, transmitting the intended maneuver message comprises transmitting the intended maneuver message using a broadcast transmission.

In a nineteenth aspect, alone or in combination with one or more of the first through eighteenth aspects, receiving, from the one or more other UEs, the one or more responses to the intended maneuver message is based at least in part on the one or more other UEs determining a relevant area associated with the target road resource and the one or more other UEs determining that the one or more other UEs are located within the relevant area.

In a twentieth aspect, alone or in combination with one or more of the first through nineteenth aspects, transmitting the intended maneuver message comprises transmitting the intended maneuver message and a relevant area associated with at least one target road resource of the one or more target road resources using a broadcast transmission.

In a twenty-first aspect, alone or in combination with one or more of the first through twentieth aspects, receiving, from the one or more other UEs, the one or more responses to the intended maneuver message is based at least in part on the one or more other UEs confirming that the one or more other UEs are located within the relevant area.

In a twenty-second aspect, alone or in combination with one or more of the first through twenty-first aspects, transmitting the intended maneuver message comprises determining a set of UEs that are located within a relevant area associated with the target road resource, and transmitting, to the set of UEs, the intended maneuver message using a groupcast transmission.

In a twenty-third aspect, alone or in combination with one or more of the first through twenty-second aspects, receiving, from the one or more other UEs, the one or more responses to the intended maneuver message is based at least in part on the one or more other UEs receiving the intended maneuver message using the groupcast transmission.

In a twenty-fourth aspect, alone or in combination with one or more of the first through twenty-third aspects, the groupcast transmission is a Layer 2 transmission.

In a twenty-fifth aspect, alone or in combination with one or more of the first through twenty-fourth aspects, process 1100 includes determining that the maneuver of the vehicle has been granted based at least in part on receiving, from one or more other UEs, one or more responses to the intended maneuver message indicating an acceptance of the maneuver, wherein performing the action comprises transmitting a granted maneuver message indicating the maneuver and the target road resource associated with the maneuver.

In a twenty-sixth aspect, alone or in combination with one or more of the first through twenty-fifth aspects, process 1100 includes determining, after transmitting the granted maneuver message, that the vehicle is unable to complete the maneuver; and transmitting a cancellation message based at least in part on determining that the vehicle is unable to complete the maneuver, wherein transmitting the cancellation message causes the UE to return to a pre-awareness state or a preparation state.

In a twenty-seventh aspect, alone or in combination with one or more of the first through twenty-sixth aspects, process 1100 includes receiving, after transmitting the granted maneuver message and from a different UE, a cancellation message indicating that the maneuver is unable to be completed; and returning to a pre-awareness state or a preparation state based at least in part on receiving the cancellation message.

In a twenty-eighth aspect, alone or in combination with one or more of the first through twenty-seventh aspects, process 1100 includes transmitting a different cancellation message based at least in part on receiving the cancellation message, wherein the different cancellation message indicates that the maneuver indicated in the granted maneuver message has been canceled.

In a twenty-ninth aspect, alone or in combination with one or more of the first through twenty-eighth aspects, the intended maneuver message indicates a maneuver type associated with the maneuver.

In a thirtieth aspect, alone or in combination with one or more of the first through twenty-ninth aspects, the maneuver type indicates a priority level associated with the maneuver.

In a thirty-first aspect, alone or in combination with one or more of the first through thirtieth aspects, the maneuver type includes at least one of a primary maneuver type or a secondary maneuver type.

In a thirty-second aspect, alone or in combination with one or more of the first through thirty-first aspects, the maneuver type includes at least one of a lane maintenance maneuver type, a lane change maneuver type, a swerve maneuver type, a turning maneuver type, a crossing lane maneuver type, a change in direction maneuver type, a reverse driving maneuver type, an overtake maneuver type, a passing maneuver type, an intersection handling maneuver type, an interchange maneuver type, a pedestrian crossing maneuver type, a cycle crossing maneuver type, a railway crossing maneuver type, a turnabout maneuver type, a leaving or joining traffic maneuver type, a school zone handling maneuver type, an avoidance maneuver type, an emergency maneuver type, a cut-in maneuver type, or a combination thereof.

In a thirty-third aspect, alone or in combination with one or more of the first through thirty-second aspects, process 1100 includes determining motion information associated with a target road resource of the one or more target road resources associated with the maneuver, and transmitting the intended maneuver message comprises transmitting the intended maneuver message indicating the motion information.

In a thirty-fourth aspect, alone or in combination with one or more of the first through thirty-third aspects, determining the motion information associated with the target road resource of the one or more target road resources associated with the maneuver comprises determining a heading range associated with the target road resource of the one or more target road resources based at least in part on a targeted heading range of the vehicle when executing the maneuver.

In a thirty-fifth aspect, alone or in combination with one or more of the first through thirty-fourth aspects, determining the motion information associated with the target road resource of the one or more target road resources associated with the maneuver comprises determining a speed range associated with the target road resource of the one or more target road resources based at least in part on a targeted speed range of the vehicle when executing the maneuver.

In a thirty-sixth aspect, alone or in combination with one or more of the first through thirty-fifth aspects, determining the motion information associated with the target road resource of the one or more target road resources associated with the maneuver comprises determining an acceleration range associated with the target road resource of the one or more target road resources based at least in part on a targeted acceleration range of the vehicle when executing the maneuver.

In a thirty-seventh aspect, alone or in combination with one or more of the first through thirty-sixth aspects, process 1100 includes determining dynamic location information associated with a target road resource of the one or more target road resources associated with the maneuver, and transmitting the intended maneuver message includes transmitting the intended maneuver message indicating the dynamic location information.

In a thirty-eighth aspect, alone or in combination with one or more of the first through thirty-seventh aspects, determining the dynamic location information associated with the target road resource of the one or more target road resources associated with the maneuver comprises determining a dynamic front location of the target road resource of the one or more target road resources based at least in part on a dynamic location of a first moving vehicle, and determining a dynamic rear location of the target road resource of the one or more target road resources based at least in part on a dynamic location of a second moving vehicle.

In a thirty-ninth aspect, alone or in combination with one or more of the first through thirty-eighth aspects, process 1100 includes identifying the dynamic location information associated with the target road resource of the one or more target road resources associated with the maneuver using at least one of a vehicle identifier associated with the first moving vehicle and a location of the first moving vehicle, or a vehicle identifier associated with the second moving vehicle and a location of the second moving vehicle.

In a fortieth aspect, alone or in combination with one or more of the first through thirty ninth-aspects, determining the dynamic location information associated with the target road resource of the one or more target road resources associated with the maneuver comprises determining a dynamic front location of the target road resource of the one or more target road resources based at least in part on a dynamic location of a moving vehicle; or determining a dynamic rear location of the target road resource of the one or more target road resources based at least in part on a dynamic location of the moving vehicle.

In a forty-first aspect, alone or in combination with one or more of the first through fortieth aspects, process 1100 includes identifying the dynamic location information associated with the target road resource of the one or more target road resources associated with the maneuver using at least one of an identifier indicating that the moving vehicle is associated with the dynamic front location of the target road resource or indicating that the moving vehicle is associated with the dynamic rear location of the target road resource, a vehicle identifier associated with the moving vehicle and a location of the moving vehicle, or a distance identifier indicating a distance from the location of the moving vehicle to the opposite end of the target road resource.

In a forty-second aspect, alone or in combination with one or more of the first through forty-first aspects, process 1100 includes determining that a target road resource of the one or more target road resources identified in the intended maneuver message has been granted, wherein performing the action comprises transmitting a granted maneuver message indicating the target road resource of the one or more target road resources based at least in part on determining that the target road resource of the one or more target road resources identified in the intended maneuver message has been granted.

In a forty-third aspect, alone or in combination with one or more of the first through forty-second aspects, determining that the target road resource of the one or more target road resources identified in the intended maneuver message has been granted comprises receiving a response, from each UE of a set of UEs associated with the target road resource, to the intended maneuver message indicating an acceptance of the maneuver using the target road resource, and determining that the UE has not received, from any other UEs, a response to the intended maneuver message indicating a rejection of the maneuver using the target road resource.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
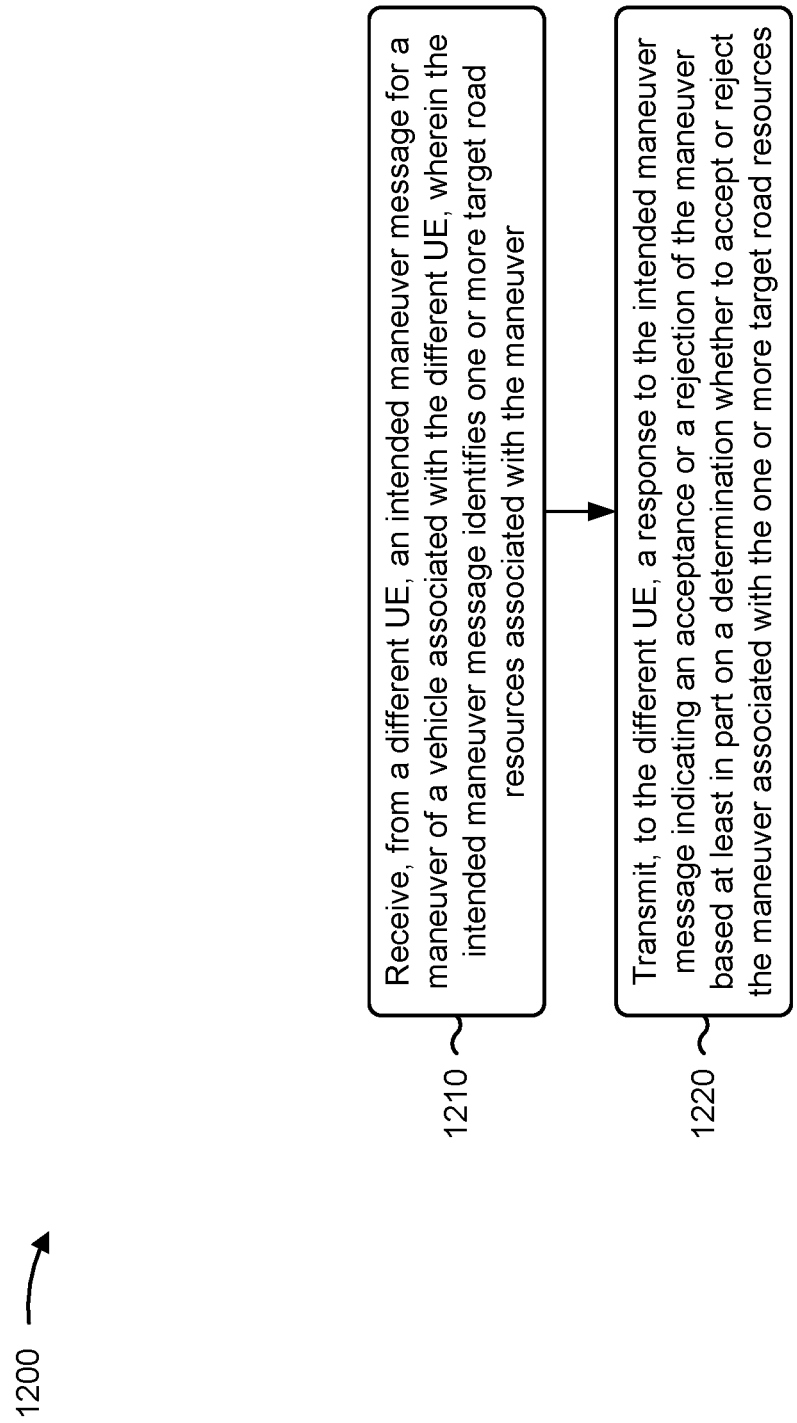

FIG. 12 is a diagram illustrating an example process 1200 performed, for example, by a UE, in accordance with the present disclosure. Example process 1200 is an example where the UE (e.g., a UE 120 depicted in, or described in connection with, FIGS. 1-10) performs operations associated with V2V maneuver sharing and coordinating.

As shown in FIG. 12, in some aspects, process 1200 may include receiving, from a different UE, an intended maneuver message for a maneuver of a vehicle associated with the different UE, wherein the intended maneuver message identifies one or more target road resources associated with the maneuver (block 1210). For example, the UE (e.g., using receive processor 258, transmit processor 264, controller/processor 280, memory 282, and/or the like) may receive, from a different UE, an intended maneuver message for a maneuver of a vehicle associated with the different UE, as described above. In some aspects, the intended maneuver message identifies one or more target road resources associated with the maneuver.

As further shown in FIG. 12, in some aspects, process 1200 may include transmitting, to the different UE, a response to the intended maneuver message indicating an acceptance or a rejection of the maneuver based at least in part on a determination whether to accept or reject the maneuver associated with the one or more target road resources (block 1220). For example, the UE (e.g., using receive processor 258, transmit processor 264, controller/processor 280, memory 282, and/or the like) may transmit, to the different UE, a response to the intended maneuver message indicating an acceptance or a rejection of the maneuver based at least in part on a determination whether to accept or reject the maneuver associated with the one or more target road resources, as described above.

Process 1200 may include additional aspects, such as any single aspect or any combination of aspects described below and/or in connection with one or more other processes described elsewhere herein.

In a first aspect, the UE is associated with a remote vehicle and the vehicle associated with the different UE is a host vehicle.

In a second aspect, alone or in combination with the first aspect, the response to the intended maneuver message indicates a rejection of the maneuver, process 1200 includes receiving, from the different UE, a cancellation message associated with the intended maneuver message indicating that the maneuver has been canceled.

In a third aspect, alone or in combination with one or more of the first and second aspects, the intended maneuver message identifies a first target road resource and a second target road resource, process 1200 includes determining that at least one target road resource of the first target road resource or the second target road resource is associated with the UE, and transmitting, to the different UE, a response to the intended maneuver message indicating an acceptance or a rejection of the maneuver comprises transmitting, to the different UE, a response to the intended maneuver message associated with the at least one target road resource.

In a fourth aspect, alone or in combination with one or more of the first through third aspects, receiving the intended maneuver message comprises receiving the intended maneuver message via a broadcast transmission.

In a fifth aspect, alone or in combination with one or more of the first through fourth aspects, process 1200 includes determining a relevant area associated with a target road resource of the one or more target road resources, wherein the relevant area is based at least in part on a distance ahead of the target road resource, a distance behind the target road resource, and a distance on each side of the target road resource; determining that the UE is located within the relevant area; and determining that the UE is associated with the intended maneuver message based at least in part on determining that the UE is located within the relevant area.

In a sixth aspect, alone or in combination with one or more of the first through fifth aspects, transmitting, to the different UE, the response to the intended maneuver message indicating an acceptance or a rejection of the maneuver is based at least in part on determining that the UE is associated with the intended maneuver message.

In a seventh aspect, alone or in combination with one or more of the first through sixth aspects, process 1200 includes determining the distance on each side of the target road resource based at least in part on a width of a lane of a road on which a vehicle associated with the UE is traveling.

In an eighth aspect, alone or in combination with one or more of the first through seventh aspects, process 1200 includes determining the distance ahead of the target road resource based at least in part on a reaction time associated with the vehicle associated with the different UE and a maximum speed associated with the target road resource, wherein the maximum speed associated with the target road resource is based at least in part on a speed of the vehicle associated with the different UE.

In a ninth aspect, alone or in combination with one or more of the first through eighth aspects, process 1200 includes determining the distance behind the target road resource based at least in part on a difference between an end time associated with the target road resource and a current time and a maximum allowed speed of a road on which a vehicle associated with the UE is traveling.

In a tenth aspect, alone or in combination with one or more of the first through ninth aspects, a front location of the target road resource is based at least in part on a location of a first moving vehicle, and a rear location of the target road resource is based at least in part on a location of a second moving vehicle, process 1200 includes determining the distance ahead of the target road resource based at least in part on a difference between an end time associated with the target road resource and a current time and a speed of the first moving vehicle, and determining the distance behind the target road resource based at least in part on a difference between a start time associated with the target road resource and a current time and a speed of the second moving vehicle.

In an eleventh aspect, alone or in combination with one or more of the first through tenth aspects, a front location of the target road resource or a rear location of the target road resource is based at least in part on a location of a moving vehicle, process 1200 includes determining the distance ahead of the target road resource based at least in part on a difference between an end time associated with the target road resource and a current time and a speed of the moving vehicle, and determining the distance behind the target road resource based at least in part on a difference between a start time associated with the target road resource and a current time and a speed of the moving vehicle.

In a twelfth aspect, alone or in combination with one or more of the first through eleventh aspects, receiving the intended maneuver message comprises receiving the intended maneuver message and a relevant area associated with at least one target road resource of the one or more target road resources using a broadcast transmission.

In a thirteenth aspect, alone or in combination with one or more of the first through twelfth aspects, process 1200 includes confirming that a location of a vehicle associated with the UE is within the relevant area, wherein transmitting, to the different UE, the response to the intended maneuver message indicating an acceptance or a rejection of the maneuver is based at least in part on confirming that the location of the vehicle associated with the UE is within the relevant area.

In a fourteenth aspect, alone or in combination with one or more of the first through thirteenth aspects, receiving the intended maneuver message comprises receiving the intended maneuver message via a groupcast transmission.

In a fifteenth aspect, alone or in combination with one or more of the first through fourteenth aspects, transmitting, to the different UE, the response to the intended maneuver message indicating an acceptance or a rejection of the maneuver is based at least in part on receiving the intended maneuver message via the groupcast transmission.

In a sixteenth aspect, alone or in combination with one or more of the first through fifteenth aspects, the groupcast transmission is a Layer 2 transmission.

In a seventeenth aspect, alone or in combination with one or more of the first through sixteenth aspects, the response to the intended maneuver message indicates an acceptance of the maneuver, process 1200 includes receiving, from the different UE, a granted maneuver message indicating the maneuver and the target road resource associated with the maneuver.

In an eighteenth aspect, alone or in combination with one or more of the first through seventeenth aspects, process 1200 includes determining, after receiving the granted maneuver message, that the maneuver is unable to be completed; and transmitting a cancellation message based at least in part on determining that the maneuver is unable to be completed, wherein transmitting the cancellation message causes the different UE to return to a pre-awareness state or a preparation state.

In a nineteenth aspect, alone or in combination with one or more of the first through eighteenth aspects, process 1200 includes receiving, after receiving the granted maneuver message and from the different UE, a cancellation message indicating that the maneuver is unable to be completed; and returning to a pre-awareness state or a preparation state based at least in part on receiving the cancellation message.

In a twentieth aspect, alone or in combination with one or more of the first through nineteenth aspects, the intended maneuver message indicates a maneuver type associated with the maneuver.

In a twenty-first aspect, alone or in combination with one or more of the first through twentieth aspects, the maneuver type indicates a priority level associated with the maneuver.

In a twenty-second aspect, alone or in combination with one or more of the first through twenty-first aspects, the maneuver type includes at least one of a primary maneuver type or a secondary maneuver type.

In a twenty-third aspect, alone or in combination with one or more of the first through twenty-second aspects, the maneuver type includes at least one of a lane maintenance maneuver type, a lane change maneuver type, a swerve maneuver type, a turning maneuver type, a crossing lane maneuver type, a change in direction maneuver type, a reverse driving maneuver type, an overtake maneuver type, a passing maneuver type, an intersection handling maneuver type, an interchange maneuver type, a pedestrian crossing maneuver type, a cycle crossing maneuver type, a railway crossing maneuver type, a turnabout maneuver type, a leaving or joining traffic maneuver type, a school zone handling maneuver type, an avoidance maneuver type, an emergency maneuver type, a cut-in maneuver type, or a combination thereof.

In a twenty-fourth aspect, alone or in combination with one or more of the first through twenty-third aspects, the intended maneuver message indicates motion information associated with a target road resource of the one or more target road resources associated with the maneuver.

In a twenty-fifth aspect, alone or in combination with one or more of the first through twenty-fourth aspects, the motion information associated with the target road resource of the one or more target road resources associated with the maneuver indicates a heading range associated with the target road resource of the one or more target road resources based at least in part on a targeted heading range of the vehicle associated with the different UE when executing the maneuver.

In a twenty-sixth aspect, alone or in combination with one or more of the first through twenty-fifth aspects, the motion information associated with the target road resource of the one or more target road resources associated with the maneuver indicates a speed range associated with the target road resource of the one or more target road resources based at least in part on a targeted speed range of the vehicle associated with the different UE when executing the maneuver.

In a twenty-seventh aspect, alone or in combination with one or more of the first through twenty-sixth aspects, the motion information associated with the target road resource of the one or more target road resources associated with the maneuver indicates an acceleration range associated with the target road resource of the one or more target road resources based at least in part on a targeted acceleration range of the vehicle associated with the different UE when executing the maneuver.

In a twenty-eighth aspect, alone or in combination with one or more of the first through twenty-seventh aspects, the intended maneuver message indicates dynamic location information associated with a target road resource of the one or more target road resources associated with the maneuver.

In a twenty-ninth aspect, alone or in combination with one or more of the first through twenty-eighth aspects, the dynamic location information associated with the target road resource of the one or more target road resources associated with the maneuver indicates a dynamic front location of the target road resource of the one or more target road resources based at least in part on a dynamic location of a first moving vehicle, and a dynamic rear location of the target road resource of the one or more target road resources based at least in part on a dynamic location of a second moving vehicle.

In a thirtieth aspect, alone or in combination with one or more of the first through twenty-ninth aspects, the dynamic location information associated with the target road resource of the one or more target road resources associated with the maneuver is indicated in the intended maneuver message using at least one of a vehicle identifier associated with the first moving vehicle and a location of the first moving vehicle, or a vehicle identifier associated with the second moving vehicle and a location of the second moving vehicle.

In a thirty-first aspect, alone or in combination with one or more of the first through thirtieth aspects, the dynamic location information associated with the target road resource of the one or more target road resources associated with the maneuver indicates a dynamic front location of the target road resource of the one or more target road resources based at least in part on a dynamic location of a moving vehicle, or a dynamic rear location of the target road resource of the one or more target road resources based at least in part on a dynamic location of the moving vehicle.

In a thirty-second aspect, alone or in combination with one or more of the first through thirty-first aspects, the dynamic location information associated with the target road resource of the one or more target road resources associated with the maneuver is indicated in the intended maneuver message using at least one of an identifier indicating that the moving vehicle is associated with the dynamic front location of the target road resource or indicating that the moving vehicle is associated with the dynamic rear location of the target road resource, a vehicle identifier associated with the moving vehicle and a location of the moving vehicle, or a distance identifier indicating a distance from the location of the moving vehicle to the opposite end of the target road resource.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some Aspects of the present disclosure:

Aspect 1: A method of wireless communication performed by a user equipment (UE), comprising: transmitting an intended maneuver message for a maneuver of a vehicle associated with the UE, wherein the intended maneuver message identifies one or more target road resources associated with the maneuver; receiving, from one or more other UEs, one or more responses to the intended maneuver message; and performing an action based at least in part on receiving the one or more responses to the intended maneuver message.

Aspect 2: The method of Aspect 1, wherein the vehicle is a host vehicle and the one or more other UEs are associated with one or more remote vehicles.

Aspect 3: The method of any of Aspects 1-2, wherein the intended maneuver message identifies a first target road resource, wherein receiving the one or more responses to the intended maneuver message comprises: receiving the one or more responses, associated with the first target road resource, indicating a rejection of the intended maneuver; and wherein performing the action comprises: returning to a pre-awareness state or a preparation state.

Aspect 4: The method of Aspect 3, wherein performing the action comprises: transmitting a cancellation message associated with the intended maneuver message.

Aspect 5: The method of any of Aspects 1-4, wherein the intended maneuver message identifies a first target road resource and a second target road resource.

Aspect 6: The method of Aspect 5, wherein receiving, from one or more other UEs, the one or more responses to the intended maneuver message comprises: receiving, from a first set of one or more other UEs, a first set of one or more responses associated with the first target road resource; and receiving, from a second set of one or more other UEs, a second set of one or more responses associated with the second target road resource.

Aspect 7: The method of Aspect 6, wherein performing the action comprises: determining that the maneuver has been granted for the first target road resource or the second target road resource based at least in part on receiving the first set of one or more responses associated with the first target road resource and the second set of one or more responses associated with the second target road resource.

Aspect 8: The method of any of Aspects 1-7, further comprising: determining a set of UEs that are located within a relevant area associated with the target road resource; and determining that the set of UEs are associated with intended maneuver message based at least in part on determining that the set of UEs are located within the relevant area associated with the target road resource.

Aspect 9: The method of Aspect 8, wherein the intended maneuver message identifies a first target road resource and a second target road resource, wherein determining the set of UEs that are located within the relevant area associated with the target road resource comprises: determining a first set of UEs that are located within a first relevant area associated with the first target road resource; and determining a second set of UEs that are located within a second relevant area associated with the second target road resource, and wherein the set of UEs that are associated with intended maneuver message includes the first set of UEs and the second set of UEs.

Aspect 10: The method of any of Aspects 8-9, further comprising: tracking, during a negotiation state associated with the intended maneuver message, each UE of the set of UEs.

Aspect 11: The method of Aspect 10, wherein tracking each UE of the set of UEs comprises: tracking, for a UE of the set of UEs, at least one of: a vehicle identifier associated with the UE of the set of UEs, a location of the UE of the set of UEs, a heading of the UE of the set of UEs, a speed of the UE of the set of UEs, an acceleration of the UE of the set of UEs, or a combination thereof.

Aspect 12: The method of any of Aspects 8-11, wherein receiving, from the one or more other UEs, the one or more responses to the intended maneuver message comprises: receiving, from a first other UE, a first response to the intended maneuver message; and determining that the first other UE is included in the set of UEs based at least in part on tracking each UE of the set of UEs.

Aspect 13: The method of Aspect 12, wherein determining that the first other UE is included in the set of UEs is based at least in part on at least one of: tracking a location of the first other UE, tracking a heading of the first other UE, tracking a speed of the first other UE, tracking an acceleration of the first other UE, or a combination thereof.

Aspect 14: The method of any of Aspects 8-13, further comprising: determining a relevant area associated with the target road resource, wherein the relevant area is based at least in part on a distance ahead of the target road resource, a distance behind the target road resource, and a distance on each side of the target road resource.

Aspect 15: The method of Aspect 14, further comprising: determining the distance on each side of the target road resource based at least in part on a width of a lane of a road on which the vehicle associated with the UE is traveling.

Aspect 16: The method of any of Aspects 14-15, further comprising: determining the distance ahead of the target road resource based at least in part on a reaction time associated with the vehicle and a maximum speed associated with the target road resource, wherein the maximum speed associated with the target road resource is based at least in part on a speed of the vehicle.

Aspect 17: The method of any of Aspects 14-16, further comprising: determining the distance behind the target road resource based at least in part on a difference between an end time associated with the target road resource and a current time and a maximum allowed speed of a road on which the vehicle associated with the UE is traveling.

Aspect 18: The method of any of Aspects 14-17, wherein a front location of the target road resource is based at least in part on a location of a first moving vehicle, and a rear location of the target road resource is based at least in part on a location of a second moving vehicle, the method further comprising: determining the distance ahead of the target road resource based at least in part on a difference between an end time associated with the target road resource and a current time and a speed of the first moving vehicle; and determining the distance behind the target road resource based at least in part on a difference between a start time associated with the target road resource and a current time and a speed of the second moving vehicle.

Aspect 19: The method of any of Aspects 14-18, wherein a front location of the target road resource or a rear location of the target road resource is based at least in part on a location of a moving vehicle, the method further comprising: determining the distance ahead of the target road resource based at least in part on a difference between an end time associated with the target road resource and a current time and a speed of the moving vehicle; and determining the distance behind the target road resource based at least in part on a difference between a start time associated with the target road resource and a current time and a speed of the moving vehicle.

Aspect 20: The method of any of Aspects 1-19, wherein transmitting the intended maneuver message comprises: transmitting the intended maneuver message using a broadcast transmission.

Aspect 21: The method of Aspect 20, wherein receiving, from the one or more other UEs, the one or more responses to the intended maneuver message is based at least in part on the one or more other UEs determining a relevant area associated with the target road resource and the one or more other UEs determining that the one or more other UEs are located within the relevant area.

Aspect 22: The method of any of Aspects 1-21, wherein transmitting the intended maneuver message comprises: transmitting the intended maneuver message and a relevant area associated with at least one target road resource of the one or more target road resources using a broadcast transmission.

Aspect 23: The method of Aspect 22, wherein receiving, from the one or more other UEs, the one or more responses to the intended maneuver message is based at least in part on the one or more other UEs confirming that the one or more other UEs are located within the relevant area.

Aspect 24: The method of any of Aspects 1-23, wherein transmitting the intended maneuver message comprises: determining a set of UEs that are located within a relevant area associated with the target road resource; and transmitting, to the set of UEs, the intended maneuver message using a groupcast transmission.

Aspect 25: The method of Aspect 24, wherein receiving, from the one or more other UEs, the one or more responses to the intended maneuver message is based at least in part on the one or more other UEs receiving the intended maneuver message using the groupcast transmission.

Aspect 26: The method of any of Aspects 24-25, wherein the groupcast transmission is a Layer 2 transmission.

Aspect 27: The method of any of Aspects 1-26, further comprising: determining that the maneuver of the vehicle has been granted based at least in part on receiving, from one or more other UEs, the one or more responses to the intended maneuver message indicating an acceptance of the maneuver, wherein performing the action comprises: transmitting a granted maneuver message indicating the maneuver and the target road resource associated with the maneuver.

Aspect 28: The method of Aspect 27, further comprising: determining, after transmitting the granted maneuver message, that the vehicle is unable to complete the maneuver; and transmitting a cancellation message based at least in part on determining that the vehicle is unable to complete the maneuver, wherein transmitting the cancellation message causes the UE to return to a pre-awareness state or a preparation state.

Aspect 29: The method of any of Aspects 27-28, further comprising: receiving, after transmitting the granted maneuver message and from a different UE, a cancellation message indicating that the maneuver is unable to be completed; and returning to a pre-awareness state or a preparation state based at least in part on receiving the cancellation message.

Aspect 30: The method of Aspect 29, further comprising: transmitting a different cancellation message based at least in part on receiving the cancellation message, wherein the different cancellation message indicates that the maneuver indicated in the granted maneuver message has been canceled.

Aspect 31: The method of any of Aspects 1-30, wherein the intended maneuver message indicates a maneuver type associated with the maneuver.

Aspect 32: The method of Aspect 31, wherein the maneuver type indicates a priority level associated with the maneuver.

Aspect 33: The method of any of Aspects 31-32, wherein the maneuver type includes at least one of a primary maneuver type or a secondary maneuver type.

Aspect 34: The method of any of Aspects 31-33, wherein the maneuver type includes at least one of: a lane maintenance maneuver type, a lane change maneuver type, a swerve maneuver type, a turning maneuver type, a crossing lane maneuver type, a change in direction maneuver type, a reverse driving maneuver type, an overtake maneuver type, a passing maneuver type, an intersection handling maneuver type, an interchange maneuver type, a pedestrian crossing maneuver type, a cycle crossing maneuver type, a railway crossing maneuver type, a turnabout maneuver type, a leaving or joining traffic maneuver type, a school zone handling maneuver type, an avoidance maneuver type, an emergency maneuver type, a cut-in maneuver type, or a combination thereof.

Aspect 35: The method of any of Aspects 1-34, further comprising: determining motion information associated with a target road resource of the one or more target road resources associated with the maneuver, wherein transmitting the intended maneuver message comprises transmitting the intended maneuver message indicating the motion information.

Aspect 36: The method of Aspect 35, wherein determining the motion information associated with the target road resource of the one or more target road resources associated with the maneuver comprises: determining a heading range associated with the target road resource of the one or more target road resources based at least in part on a targeted heading range of the vehicle when executing the maneuver.

Aspect 37: The method of any of Aspects 35-36, wherein determining the motion information associated with the target road resource of the one or more target road resources associated with the maneuver comprises: determining a speed range associated with the target road resource of the one or more target road resources based at least in part on a targeted speed range of the vehicle when executing the maneuver.

Aspect 38: The method of any of Aspects 35-37, wherein determining the motion information associated with the target road resource of the one or more target road resources associated with the maneuver comprises: determining an acceleration range associated with the target road resource of the one or more target road resources based at least in part on a targeted acceleration range of the vehicle when executing the maneuver.

Aspect 39: The method of any of Aspects 1-38, further comprising: determining dynamic location information associated with a target road resource of the one or more target road resources associated with the maneuver, wherein transmitting the intended maneuver message comprises transmitting the intended maneuver message indicating the dynamic location information.

Aspect 40: The method of Aspect 39, wherein determining the dynamic location information associated with the target road resource of the one or more target road resources associated with the maneuver comprises: determining a dynamic front location of the target road resource of the one or more target road resources based at least in part on a dynamic location of a first moving vehicle; and determining a dynamic rear location of the target road resource of the one or more target road resources based at least in part on a dynamic location of a second moving vehicle.

Aspect 41: The method of Aspect 40, further comprising: identifying the dynamic location information associated with the target road resource of the one or more target road resources associated with the maneuver using at least one of: a vehicle identifier associated with the first moving vehicle and a location of the first moving vehicle, or a vehicle identifier associated with the second moving vehicle and a location of the second moving vehicle.

Aspect 42: The method of any of Aspects 39-41, wherein determining the dynamic location information associated with the target road resource of the one or more target road resources associated with the maneuver comprises: determining a dynamic front location of the target road resource of the one or more target road resources based at least in part on a dynamic location of a moving vehicle; or determining a dynamic rear location of the target road resource of the one or more target road resources based at least in part on a dynamic location of the moving vehicle.

Aspect 43: The method of Aspect 42, further comprising: identifying the dynamic location information associated with the target road resource of the one or more target road resources associated with the maneuver using at least one of: an identifier indicating that the moving vehicle is associated with the dynamic front location of the target road resource or indicating that the moving vehicle is associated with the dynamic rear location of the target road resource, a vehicle identifier associated with the moving vehicle and a location of the moving vehicle, or a distance identifier indicating a distance from the location of the moving vehicle to the opposite end of the target road resource.

Aspect 44: The method of any of Aspects 1-43, further comprising: determining that a target road resource of the one or more target road resources identified in the intended maneuver message has been granted, wherein performing the action comprises: transmitting a granted maneuver message indicating the target road resource of the one or more target road resources based at least in part on determining that the target road resource of the one or more target road resources identified in the intended maneuver message has been granted.

Aspect 45: The method of Aspect 44, wherein determining that the target road resource of the one or more target road resources identified in the intended maneuver message has been granted comprises: receiving a response, from each UE of a set of UEs associated with the target road resource, to the intended maneuver message indicating an acceptance of the maneuver using the target road resource; and determining that the UE has not received, from any other UEs, a response to the intended maneuver message indicating a rejection of the maneuver using the target road resource.

Aspect 46: A method of wireless communication performed by a user equipment (UE), comprising: receiving, from a different UE, an intended maneuver message for a maneuver of a vehicle associated with the different UE, wherein the intended maneuver message identifies one or more target road resources associated with the maneuver; and transmitting, to the different UE, a response to the intended maneuver message indicating an acceptance or a rejection of the maneuver based at least in part on a determination whether to accept or reject the maneuver associated with the one or more target road resources.

Aspect 47: The method of Aspect 46, wherein the UE is associated with a remote vehicle and the vehicle associated with the different UE is a host vehicle.

Aspect 48: The method of any of Aspects 46-47, wherein the response to the intended maneuver message indicates a rejection of the maneuver, the method further comprising: receiving, from the different UE, a cancellation message associated with the intended maneuver message indicating that the maneuver has been canceled.

Aspect 49: The method of any of Aspects 46-48, wherein the intended maneuver message identifies a first target road resource and a second target road resource, the method further comprising: determining that at least one target road resource of the first target road resource or the second target road resource is associated with the UE, wherein transmitting, to the different UE, a response to the intended maneuver message indicating an acceptance or a rejection of the maneuver comprises: transmitting, to the different UE, a response to the intended maneuver message associated with the at least one target road resource.

Aspect 50: The method of any of Aspects 46-49, wherein receiving the intended maneuver message comprises: receiving the intended maneuver message via a broadcast transmission.

Aspect 51: The method of Aspect 50, further comprising: determining a relevant area associated with a target road resource of the one or more target road resources, wherein the relevant area is based at least in part on a distance ahead of the target road resource, a distance behind the target road resource, and a distance on each side of the target road resource; determining that the UE is located within the relevant area; and determining that the UE is associated with the intended maneuver message based at least in part on determining that the UE is located within the relevant area.

Aspect 52: The method of Aspect 51, wherein transmitting, to the different UE, the response to the intended maneuver message indicating an acceptance or a rejection of the maneuver is based at least in part on determining that the UE is associated with the intended maneuver message.

Aspect 53: The method of any of Aspects 51-52, further comprising: determining the distance on each side of the target road resource based at least in part on a width of a lane of a road on which a vehicle associated with the UE is traveling.

Aspect 54: The method of any of Aspects 51-53, further comprising: determining the distance ahead of the target road resource based at least in part on a reaction time associated with the vehicle associated with the different UE and a maximum speed associated with the target road resource, wherein the maximum speed associated with the target road resource is based at least in part on a speed of the vehicle associated with the different UE.

Aspect 55: The method of any of Aspects 51-54, further comprising: determining the distance behind the target road resource based at least in part on a difference between an end time associated with the target road resource and a current time and a maximum allowed speed of a road on which a vehicle associated with the UE is traveling.

Aspect 56: The method of any of Aspects 51-55, wherein a front location of the target road resource is based at least in part on a location of a first moving vehicle, and a rear location of the target road resource is based at least in part on a location of a second moving vehicle, the method further comprising: determining the distance ahead of the target road resource based at least in part on a difference between an end time associated with the target road resource and a current time and a speed of the first moving vehicle; and determining the distance behind the target road resource based at least in part on a difference between a start time associated with the target road resource and a current time and a speed of the second moving vehicle.

Aspect 57: The method of any of Aspects 51-56, wherein a front location of the target road resource or a rear location of the target road resource is based at least in part on a location of a moving vehicle, the method further comprising: determining the distance ahead of the target road resource based at least in part on a difference between an end time associated with the target road resource and a current time and a speed of the moving vehicle; and determining the distance behind the target road resource based at least in part on a difference between a start time associated with the target road resource and a current time and a speed of the moving vehicle.

Aspect 58: The method of any of Aspects 46-57, wherein receiving the intended maneuver message comprises: receiving the intended maneuver message and a relevant area associated with at least one target road resource of the one or more target road resources using a broadcast transmission.

Aspect 59: The method of Aspect 58, further comprising: confirming that a location of a vehicle associated with the UE is within the relevant area, wherein transmitting, to the different UE, the response to the intended maneuver message indicating an acceptance or a rejection of the maneuver is based at least in part on confirming that the location of the vehicle associated with the UE is within the relevant area.

Aspect 60: The method of any of Aspects 46-59, wherein receiving the intended maneuver message comprises: receiving the intended maneuver message via a groupcast transmission.

Aspect 61: The method of Aspect 60, wherein transmitting, to the different UE, the response to the intended maneuver message indicating an acceptance or a rejection of the maneuver is based at least in part on receiving the intended maneuver message via the groupcast transmission.

Aspect 62: The method of any of Aspects 60-61, wherein the groupcast transmission is a Layer 2 transmission.

Aspect 63: The method of any of Aspects 46-62, wherein the response to the intended maneuver message indicates an acceptance of the maneuver, the method further comprising: receiving, from the different UE, a granted maneuver message indicating the maneuver and the target road resource associated with the maneuver.

Aspect 64: The method of Aspect 63, further comprising: determining, after receiving the granted maneuver message, that the maneuver is unable to be completed; and transmitting a cancellation message based at least in part on determining that the maneuver is unable to be completed, wherein transmitting the cancellation message causes the different UE to return to a pre-awareness state or a preparation state.

Aspect 65: The method of any of Aspects 63-64, further comprising: receiving, after receiving the granted maneuver message and from the different UE, a cancellation message indicating that the maneuver is unable to be completed; and returning to a pre-awareness state or a preparation state based at least in part on receiving the cancellation message.

Aspect 66: The method of any of Aspects 46-65, wherein the intended maneuver message indicates a maneuver type associated with the maneuver.

Aspect 67: The method of Aspect 66, wherein the maneuver type indicates a priority level associated with the maneuver.

Aspect 68: The method of any of Aspects 66-67, wherein the maneuver type includes at least one of a primary maneuver type or a secondary maneuver type.

Aspect 69: The method of any of Aspects 66-68, wherein the maneuver type includes at least one of: a lane maintenance maneuver type, a lane change maneuver type, a swerve maneuver type, a turning maneuver type, a crossing lane maneuver type, a change in direction maneuver type, a reverse driving maneuver type, an overtake maneuver type, a passing maneuver type, an intersection handling maneuver type, an interchange maneuver type, a pedestrian crossing maneuver type, a cycle crossing maneuver type, a railway crossing maneuver type, a turnabout maneuver type, a leaving or joining traffic maneuver type, a school zone handling maneuver type, an avoidance maneuver type, an emergency maneuver type, a cut-in maneuver type, or a combination thereof.

Aspect 70: The method of any of Aspects 46-69, wherein the intended maneuver message indicates motion information associated with a target road resource of the one or more target road resources associated with the maneuver.

Aspect 71: The method of Aspect 70, wherein the motion information associated with the target road resource of the one or more target road resources associated with the maneuver indicates a heading range associated with the target road resource of the one or more target road resources based at least in part on a targeted heading range of the vehicle associated with the different UE when executing the maneuver.

Aspect 72: The method of any of Aspects 70-71, wherein the motion information associated with the target road resource of the one or more target road resources associated with the maneuver indicates a speed range associated with the target road resource of the one or more target road resources based at least in part on a targeted speed range of the vehicle associated with the different UE when executing the maneuver.

Aspect 73: The method of any of Aspects 70-72, wherein the motion information associated with the target road resource of the one or more target road resources associated with the maneuver indicates an acceleration range associated with the target road resource of the one or more target road resources based at least in part on a targeted acceleration range of the vehicle associated with the different UE when executing the maneuver.

Aspect 74: The method of any of Aspects 46-73, wherein the intended maneuver message indicates dynamic location information associated with a target road resource of the one or more target road resources associated with the maneuver.

Aspect 75: The method of Aspect 74, wherein the dynamic location information associated with the target road resource of the one or more target road resources associated with the maneuver indicates: a dynamic front location of the target road resource of the one or more target road resources based at least in part on a dynamic location of a first moving vehicle, and a dynamic rear location of the target road resource of the one or more target road resources based at least in part on a dynamic location of a second moving vehicle.

Aspect 76: The method of Aspect 75, wherein the dynamic location information associated with the target road resource of the one or more target road resources associated with the maneuver is indicated in the intended maneuver message using at least one of: a vehicle identifier associated with the first moving vehicle and a location of the first moving vehicle, or a vehicle identifier associated with the second moving vehicle and a location of the second moving vehicle.

Aspect 77: The method of any of Aspects 74-76, wherein the dynamic location information associated with the target road resource of the one or more target road resources associated with the maneuver indicates: a dynamic front location of the target road resource of the one or more target road resources based at least in part on a dynamic location of a moving vehicle, or a dynamic rear location of the target road resource of the one or more target road resources based at least in part on a dynamic location of the moving vehicle.

Aspect 78: The method of Aspect 77, wherein the dynamic location information associated with the target road resource of the one or more target road resources associated with the maneuver is indicated in the intended maneuver message using at least one of: an identifier indicating that the moving vehicle is associated with the dynamic front location of the target road resource or indicating that the moving vehicle is associated with the dynamic rear location of the target road resource, a vehicle identifier associated with the moving vehicle and a location of the moving vehicle, or a distance identifier indicating a distance from the location of the moving vehicle to the opposite end of the target road resource.

Aspect 79: An apparatus for wireless communication at a device, comprising a processor; memory coupled with the processor; and instructions stored in the memory and executable by the processor to cause the apparatus to perform the method of one or more of Aspects 1-45.

Aspect 80: A device for wireless communication, comprising a memory and one or more processors coupled to the memory, the one or more processors configured to perform the method of one or more of Aspects 1-45.

Aspect 81: An apparatus for wireless communication, comprising at least one means for performing the method of one or more of Aspects 1-45.

Aspect 82: A non-transitory computer-readable medium storing code for wireless communication, the code comprising instructions executable by a processor to perform the method of one or more of Aspects 1-45.

Aspect 83: A non-transitory computer-readable medium storing a set of instructions for wireless communication, the set of instructions comprising one or more instructions that, when executed by one or more processors of a device, cause the device to perform the method of one or more of Aspects 1-45.

Aspect 84: An apparatus for wireless communication at a device, comprising a processor; memory coupled with the processor; and instructions stored in the memory and executable by the processor to cause the apparatus to perform the method of one or more of Aspects 46-78.

Aspect 85: A device for wireless communication, comprising a memory and one or more processors coupled to the memory, the one or more processors configured to perform the method of one or more of Aspects 46-78.

Aspect 86: An apparatus for wireless communication, comprising at least one means for performing the method of one or more of Aspects 46-78.

Aspect 87: A non-transitory computer-readable medium storing code for wireless communication, the code comprising instructions executable by a processor to perform the method of one or more of Aspects 46-78.

Aspect 88: A non-transitory computer-readable medium storing a set of instructions for wireless communication, the set of instructions comprising one or more instructions that, when executed by one or more processors of a device, cause the device to perform the method of one or more of Aspects 46-78.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting an intended maneuver message for a maneuver of a vehicle associated with the UE, wherein the intended maneuver message identifies a target road resource that the vehicle intends to move to in association with the maneuver, the target road resource being defined at least in part using a width and using:
        a front location in latitude and longitude and a rear location in latitude and longitude, or
        one or more other vehicle positions of one or more other vehicles;
    receiving, from one or more other UEs, one or more responses to the intended maneuver message based at least in part on the one or more other UEs being located within a relevant area of the target road resource, the relevant area being determined based at least in part on a first distance determined ahead of the target road resource, a second distance determined behind the target road resource, and a third distance that is determined on each side of the target road resource based at least in part on a width of a lane of a road on which the vehicle is traveling; and
    performing, based at least in part on receiving the one or more responses to the intended maneuver message, at least one of:
        causing the vehicle to move, or
        returning to a state for communicating vehicle information with the one or more other UEs.

2. The method of claim 1, wherein the intended maneuver message identifies a first target road resource,
    wherein receiving the one or more responses to the intended maneuver message comprises:
        receiving the one or more responses, associated with the first target road resource, indicating a rejection of the maneuver; and wherein receiving the one or more responses causes the UE to return to the state, and wherein returning to the state comprises:
returning to a pre-awareness state or a preparation state.

3. The method of claim 2, further comprising:
transmitting a cancellation message associated with the intended maneuver message.

4. The method of claim 1, wherein the intended maneuver message identifies a first target road resource and a second target road resource.

5. The method of claim 1, further comprising:
determining a set of UEs that are located within the relevant area associated with the target road resource; and
determining that the set of UEs are associated with the intended maneuver message based at least in part on determining that the set of UEs are located within the relevant area associated with the target road resource.

6. The method of claim 1, further comprising:
determining that the maneuver of the vehicle has been granted based at least in part on receiving, from the one or more other UEs, the one or more responses to the intended maneuver message indicating an acceptance of the maneuver; and
transmitting a granted maneuver message indicating the maneuver and the target road resource associated with the maneuver.

7. The method of claim 6, further comprising:
determining, after transmitting the granted maneuver message, that the vehicle is unable to complete the maneuver; and
transmitting a cancellation message based at least in part on determining that the vehicle is unable to complete the maneuver, wherein transmitting the cancellation message causes the UE to return to the state, and wherein the state is a pre-awareness state or a preparation state.

8. The method of claim 6, further comprising:
receiving, after transmitting the granted maneuver message and from a different UE, a cancellation message indicating that the maneuver is unable to be completed; and
returning to the state based at least in part on receiving the cancellation message, the state being a pre-awareness state or a preparation state.

9. The method of claim 1, wherein the intended maneuver message indicates a maneuver type associated with the maneuver.

10. The method of claim 1, further comprising:
determining motion information associated with the target road resource,
wherein transmitting the intended maneuver message comprises transmitting the intended maneuver message indicating the motion information.

11. The method of claim 10, wherein determining the motion information associated with the target road resource comprises:
determining a speed range associated with the target road resource based at least in part on a targeted speed range of the vehicle when executing the maneuver.

12. The method of claim 1, further comprising:
determining dynamic location information associated with the target road resource,
wherein transmitting the intended maneuver message comprises transmitting the intended maneuver message indicating the dynamic location information.

13. The method of claim 12, wherein determining the dynamic location information associated with the target road resource comprises at least one of:
determining a dynamic front location of the target road resource based at least in part on a dynamic location of a moving vehicle; or
determining a dynamic rear location of the target road resource based at least in part on a dynamic location of the moving vehicle.

14. A user equipment (UE) for wireless communication, comprising:
a memory; and
one or more processors, coupled to the memory, configured to:
transmit an intended maneuver message for a maneuver of a vehicle associated with the UE, wherein the intended maneuver message identifies a target road resource that the vehicle intends to move to in association with the maneuver, the target road resource being defined at least in part using a width and using:
a front location in latitude and longitude and a rear location in latitude and longitude, or
one or more other vehicle positions of one or more other vehicles;
receive, from one or more other UEs, one or more responses to the intended maneuver message based at least in part on the one or more other UEs being located within a relevant area of the target road resource, the relevant area being determined based at least in part on a first distance determined ahead of the target road resource, a second distance determined behind the target road resource, and a third distance that is determined on each side of the target road resource based at least in part on a width of a lane of a road on which the vehicle is traveling; and
perform, based at least in part on receiving the one or more responses to the intended maneuver message, at least one of:
causing the vehicle to move, or
returning to a state for communicating vehicle information with the one or more other UEs.

15. The UE of claim 14, wherein the intended maneuver message identifies a first target road resource,
wherein the one or more processors, to receive the one or more responses to the intended maneuver message, are configured to:
receive the one or more responses, associated with the first target road resource, indicating a rejection of the maneuver; and
wherein receiving the one or more responses causes the UE to return to the state, and wherein the one or more processors, to return to the state, are configured to:
return to a pre-awareness state or a preparation state.

16. The UE of claim 15, wherein the one or more processors are further configured to:
transmit a cancellation message associated with the intended maneuver message.

17. The UE of claim 14, wherein the intended maneuver message identifies a first target road resource and a second target road resource.

18. The UE of claim 14, wherein the one or more processors are further configured to:
determine a set of UEs that are located within the relevant area associated with the target road resource; and
determine that the set of UEs are associated with the intended maneuver message based at least in part on determining that the set of UEs are located within the relevant area associated with the target road resource.

19. The UE of claim 14, wherein the one or more processors are further configured to:
   determine that the maneuver of the vehicle has been granted based at least in part on receiving, from the one or more other UEs, the one or more responses to the intended maneuver message indicating an acceptance of the maneuver; and
   transmit a granted maneuver message indicating the maneuver and the target road resource associated with the maneuver.

20. The UE of claim 19, wherein the one or more processors are further configured to:
   determine, after transmitting the granted maneuver message, that the vehicle is unable to complete the maneuver; and
   transmit a cancellation message based at least in part on determining that the vehicle is unable to complete the maneuver, wherein transmitting the cancellation message causes the UE to return to the state, and wherein the state is a pre-awareness state or a preparation state.

21. The UE of claim 19, wherein the one or more processors are further configured to:
   receive, after transmitting the granted maneuver message and from a different UE, a cancellation message indicating that the maneuver is unable to be completed; and
   return to the state based at least in part on receiving the cancellation message, the state being a pre-awareness state or a preparation state.

22. The UE of claim 14, wherein the intended maneuver message indicates a maneuver type associated with the maneuver.

23. The UE of claim 14, wherein the one or more processors are further configured to:
   determine motion information associated with the target road resource,
      wherein the one or more processors, to transmit the intended maneuver message, are configured to transmit the intended maneuver message indicating the motion information.

24. The UE of claim 23, wherein the one or more processors, to determine the motion information associated with the target road resource, are configured to:
   determine a speed range associated with the target road resource based at least in part on a targeted speed range of the vehicle when executing the maneuver.

25. The UE of claim 14, wherein the one or more processors are further configured to:
   determine dynamic location information associated with the target road resource,
      wherein the one or more processors, to transmit the intended maneuver message, are configured to transmit the intended maneuver message indicating the dynamic location information.

26. The UE of claim 25, wherein the one or more processors, to determine the dynamic location information associated with the target road resource, are configured to:
   determine a dynamic front location of the target road resource based at least in part on a dynamic location of a moving vehicle; or
   determine a dynamic rear location of the target road resource based at least in part on a dynamic location of the moving vehicle.

27. A non-transitory computer-readable medium storing a set of instructions for wireless communication, the set of instructions comprising:
   one or more instructions that, when executed by one or more processors of a user equipment (UE), cause the UE to:
      transmit an intended maneuver message for a maneuver of a vehicle associated with the UE, wherein the intended maneuver message identifies a target road resource that the vehicle intends to move to in association with the maneuver, the target road resource being defined at least in part using a width and using:
         a front location in latitude and longitude and a rear location in latitude and longitude, or
         one or more other vehicle positions of one or more other vehicles;
      receive, from one or more other UEs, one or more responses to the intended maneuver message based at least in part on the one or more other UEs being located within a relevant area of the target road resource, the relevant area being determined based at least in part on a first distance determined ahead of the target road resource, a second distance determined behind the target road resource, and a third distance that is determined on each side of the target road resource based at least in part on a width of a lane of a road on which the vehicle is traveling; and
      perform, based at least in part on receiving the one or more responses to the intended maneuver message, at least one of:
         causing the vehicle to move, or
         returning to a state for communicating vehicle information with the one or more other UEs.

28. An apparatus for wireless communication, comprising:
   means for transmitting an intended maneuver message for a maneuver of a vehicle associated with the apparatus, wherein the intended maneuver message identifies a target road resource that the vehicle intends to move to in association with the maneuver, the target road resource being defined at least in part using a width and using:
      a front location in latitude and longitude and a rear location in latitude and longitude, or
      one or more other vehicle positions of one or more other vehicles;
   means for receiving, from one or more user equipments (UEs), one or more responses to the intended maneuver message based at least in part on the one or more UEs being located within a relevant area of the target road resource, the relevant area being determined based at least in part on a first distance determined ahead of the target road resource, a second distance determined behind the target road resource, and a third distance that is determined on each side of the target road resource based at least in part on a width of a lane of a road on which the vehicle is traveling; and
   means for performing, based at least in part on receiving the one or more responses to the intended maneuver message, at least one of:
      causing the vehicle to move, or
      returning to a state for communicating vehicle information with the one or more UEs.

29. The non-transitory computer-readable medium of claim 27, wherein the intended maneuver message identifies a first target road resource,
   wherein, to receive the one or more responses to the intended maneuver message, the one or more instructions further cause the UE to:

receive the one or more responses, associated with the first target road resource, indicating a rejection of the maneuver; and wherein receiving the one or more responses causes the UE to return to the state, and wherein, to return to the state, the one or more instructions further cause the UE to:

return to a pre-awareness state or a preparation state.

30. The non-transitory computer-readable medium of claim 27, wherein the intended maneuver message identifies a first target road resource and a second target road resource.

\* \* \* \* \*